United States Patent [19]
Muramatsu et al.

[11] Patent Number: 5,240,177
[45] Date of Patent: Aug. 31, 1993

[54] CONTAINER WITH DEVICE PREVENTING DEW CONDENSATION

[75] Inventors: Toru Muramatsu, Toyoake; Naomi Kokubo, Toyohashi; Kazuyuki Ouchi; Fuminobu Kondoh, both of Tokyo, all of Japan

[73] Assignees: Nippondenso Co., Ltd., Kariya; Mitsui O.S.K. Lines Ltd., Minato, both of Japan

[21] Appl. No.: 813,391

[22] Filed: Dec. 27, 1991

[30] Foreign Application Priority Data

Dec. 27, 1990 [JP] Japan .................................. 2-407956
Nov. 27, 1991 [JP] Japan .................................. 3-312705

[51] Int. Cl.$^5$ .......................... F24F 7/00; G05D 22/00
[52] U.S. Cl. .................................. 236/44 C; 236/49.3; 454/118; 454/256
[58] Field of Search .................. 236/49.3, 44 A, 44 R, 236/44 C, 46 F; 165/16, 21; 454/118, 258, 256, 343

[56] References Cited

U.S. PATENT DOCUMENTS

| | | | |
|---|---|---|---|
| 3,302,546 | 2/1967 | Rath | 454/118 |
| 3,844,203 | 10/1974 | Takahashi | 454/118 |
| 3,977,208 | 8/1976 | Heighton | 454/118 |
| 4,358,934 | 11/1982 | Vankirk | 62/180 |
| 4,799,621 | 1/1989 | Reith | 236/44 CX |
| 4,877,182 | 10/1989 | Pugh et al. | 236/44 C |

FOREIGN PATENT DOCUMENTS

| | | |
|---|---|---|
| 0178326 | 4/1986 | European Pat. Off. . |
| 2001220 | 8/1971 | Fed. Rep. of Germany . |
| 3201974 | 10/1982 | Fed. Rep. of Germany . |
| 3291974 | 10/1982 | Fed. Rep. of Germany . |
| 0147242 | 7/1987 | Japan .................. 236/44 R |
| 0147243 | 7/1987 | Japan .................. 236/44 R |
| 0307509 | 12/1988 | Japan .................. 236/44 R |

*Primary Examiner*—Harry B. Tanner
*Attorney, Agent, or Firm*—Cushman, Darby & Cushman

[57] ABSTRACT

A ventilation apparatus for a container for transporting goods by truck or ship. The walls of the container are provided with an inlet opening and an outlet opening, and an inlet unit is connected to the inlet opening and an outlet unit is connected to the outlet opening. The outlet unit is provided with a battery-operated fan for a forced ventilation of the container, temperature sensors are provided for detecting the inner wall temperature and inner air temperature, and a degree of change in the wall temperature per unit of time is calculated for operating the fan when the degree of change in the wall temperature is larger than a predetermined value. Furthermore, the difference between the inner air temperature and the wall temperature is calculated, and the fan is operated when that difference is larger than a predetermined value.

14 Claims, 24 Drawing Sheets

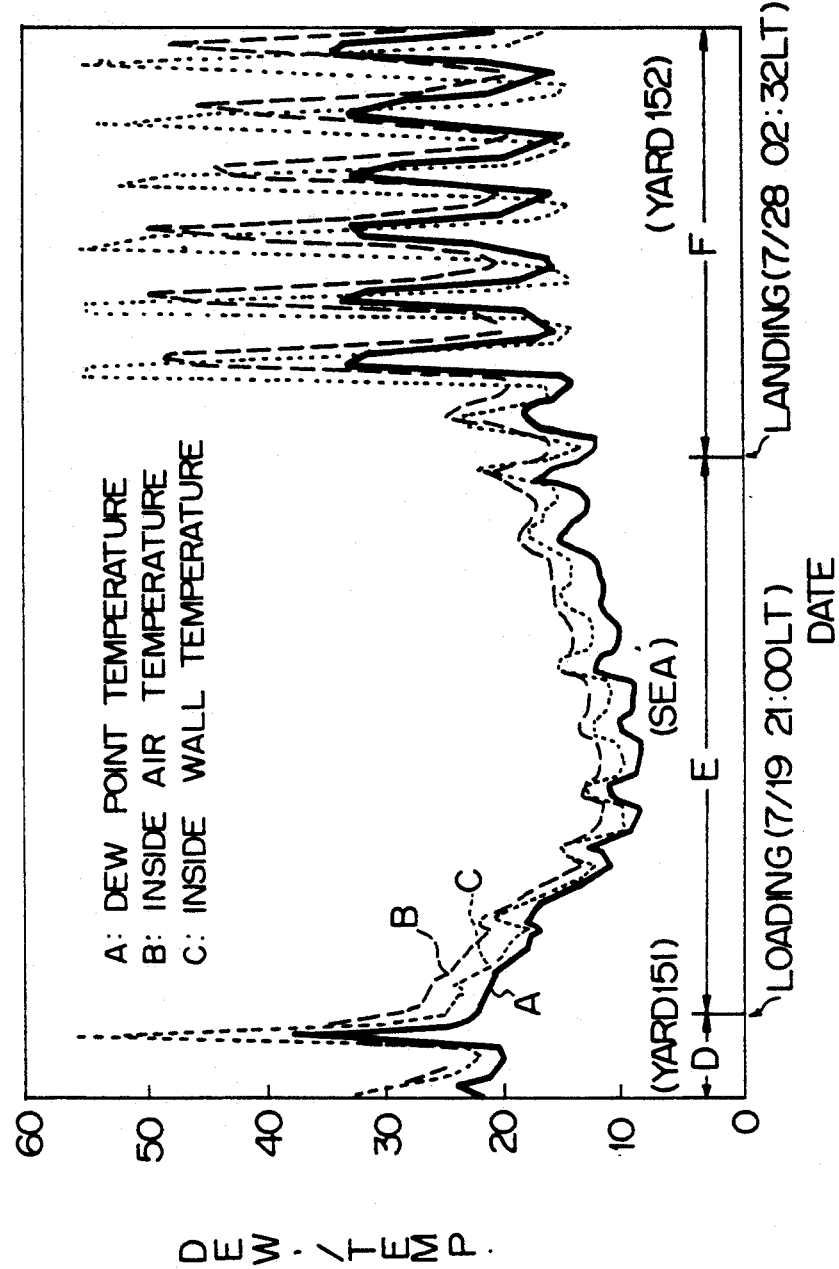

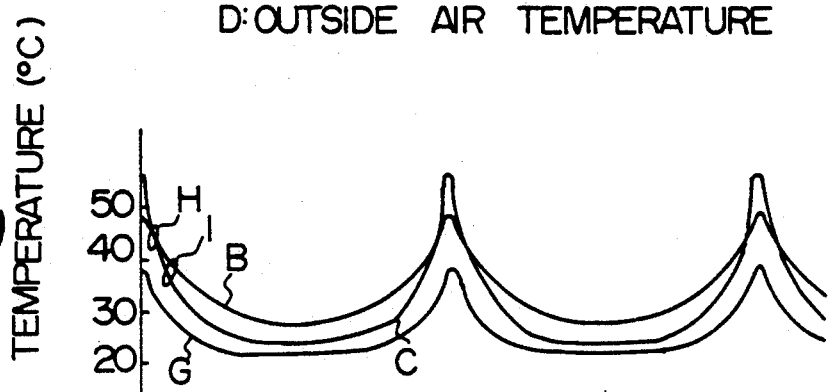
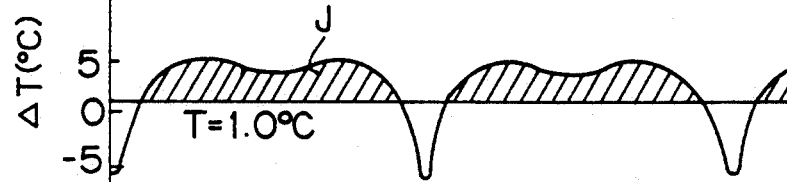
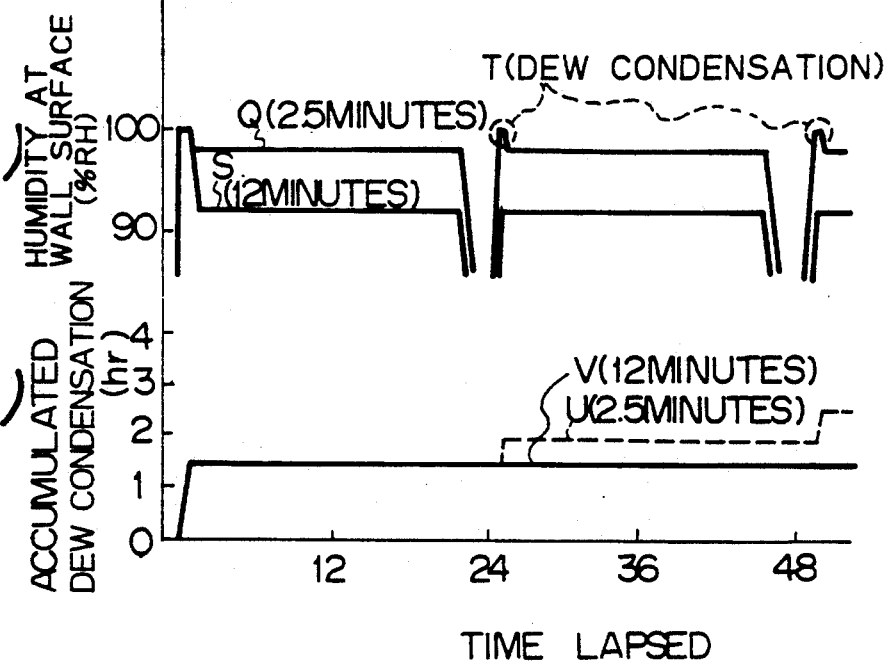

CONTAINER WITH DEVICE PREVENTING DEW CONDENSATION

BACKGROUND OF THE INVENTION

1. Field of the Invention

The present invention relates to a device for preventing dew condensation in a container, and more particularly, to a device for preventing dew condensation in a space inside a container used for transporting goods by, e.g., truck or ship.

2. Description of the Related Art

In general, a container is used for transporting a large amount of goods, and according to international regulations, such a container has a long side length of 6 meters or 12 meters, and a short side length of about 2.5 meters. The container has a predetermined inner volume, and has an outer wall made of a metal material. Due to the construction of the container, however, dew condensation is easily generated therein.

To prevent the forming of dew condensation in the container, the following techniques have been proposed.

(1) A container is constructed so that the temperature or humidity therein can be controlled.

(2) Ventilation holes are provided in the side walls of the container, to provide an internal ventilation thereof.

(3) A disposable anti-wetting sheet or desiccant is provided in the container, for eliminating moisture inside the container.

The prior art techniques listed above for eliminating moisture in the container have several drawbacks. Namely, solution (1) requires a special control device for realizing a suitably designed refrigerating cycle for the space inside the container, and thus the container must have a special and expensive construction. Furthermore, the control device for realizing a refrigeration cycle mounted in the container requires a power to be supplied from a suitable outside appliance, which is not always available in a given situation.

The solution (2) obtains a ventilation effect by using a temperature difference between the inside and outside of the container, and thus ventilation holes having a small opening do not provide a desired ventilation. If the ventilation holes have a large opening, outside water, such as rain water, can enter the space inside the container via the holes, and therefore, a specially designed device must be fitted to prevent this introduction of the outside water, which makes the system expensive.

The solution (3) is disadvantageous in that a large amount of desiccant is required since the space inside the container is under a condition such that dew condensation is very easily generated, resulting an increase in the cost due to the desiccant. Furthermore, the use of the desiccant alone does not fully prevent dew condensation over the entire region of the large space inside the container.

Another prior art, Japanese Unexamined Patent Publication No. 1-26044, discloses a device for preventing dew condensation in the home. This device is provided with a humidity sensor arranged in a room and issuing an electric signal indicating a degree of humidity therein, for operating a ventilation apparatus. Further, Japanese Unexamined Patent Publication 2-178546 discloses a device provided with a temperature sensor arranged in a room and issuing a signal indicating a need for operating a ventilation apparatus. These prior art types of ventilation apparatus for a house are sufficient to prevent dew condensation therein, since the walls and ceilings of a house are usually made of a heat insulating material, which can prevent a quick change of the temperature therein irrespective of a change in the atmospheric temperature, and thus a relatively long time must lapse before dew condensation is formed. Therefore, a mere detection of the humidity or the temperature is sufficient to prevent the occurrence of dew condensation.

Unlike a house, however, a container to which the present invention is related is used under very severe conditions from the view point of temperature, and the inventor found that a control of the ventilation apparatus by a detection of the temperature only will not prevent a forming of dew condensation in the container, because the temperature inside the container changes very rapidly.

SUMMARY OF THE INVENTION

An object of the present invention is to provide a ventilation device for a container by which an occurrence of dew condensation is effectively prevented even if the container is subjected to a rapid change in the temperature.

According to one aspect of the present invention, a container for goods is provided, comprising:
- a container body having a generally rectangular parallelepiped shape with outer walls defining a space therebetween for storing goods;
- said outer walls also defining an intake opening for an introduction of an atmospheric air into the space of the container, and an exhaust opening for a removal of the air from the inside space of the container to the atmosphere;
- the intake and the outlet openings being provided at different locations inside the container;
- a fan for generating a forced flow of air from the intake opening to the exhaust opening, via the inside space of the container;
- a sensor for detecting a temperature inside the container and issuing electric signals indicating the detected temperature;
- means for determining if a change in the detected temperature over a unit of a time is larger than a predetermined value, and;
- control means for operating the fan when said determination is positive.

According to another aspect of the present invention, a goods container is provided, comprising:
- a container body having a generally rectangular parallelepiped shape with outer walls defining a space therebetween for storing goods;
- said outer walls also defining an intake opening for an introduction of an atmospheric air into the space of the container, and an exhaust opening for a removal of the air from the inside space of the container to the atmosphere;
- the intake and the outlet openings being provided at different locations on the walls of the container;
- a fan for generating a forced flow of an air from the intake opening to the exhaust opening, via the inside space of the container;
- a first temperature sensor for detecting a temperature at the walls of the container;

a second temperature sensor for detecting a temperature of the air inside the container;

a first determining means for determining if the wall temperature detected by the first sensor is lower by a predetermined value than the air temperature detected by the second sensor;

second determining means for determining if a change in the wall temperature detected by the first sensor means over a unit of a time is larger than a predetermined value, and;

control means for operating the fan when one of said determinations is positive.

The present invention having the above-mentioned construction obtains a desired ventilation of the container to thereby prevent an occurrence of dew condensation even if the container is subjected to rapid changes in the temperature, because the above construction allows a prediction of when dew condensation is likely to occur. Namely, the present invention makes it possible for the air inside the container to be maintained in a condition above the dew point, i.e., the humidity inside the container is always maintained below 100%.

Advantageously, one of said openings is located at the top of one of the walls of the container defining entrance for the goods, and the other opening is located at the top of the wall of the container opposite that wall. With this arrangement, when a plurality of containers are positioned next to each other, openings used for a ventilation of a container are not closed by another container adjacent thereto.

Advantageously, a cover (or baffle plate) is arranged adjacent to the fan, to prevent a reverse flow of the air from the atmosphere into the container via the exhaust opening. This construction is advantageous in that an influence of a reverse flow generated at the outlet opening is minimized, to thereby maintain a desired ventilated condition.

The fan may be operated by a dry battery or rechargeable battery, which eliminates the necessity for an outside power source while maintaining the operation of the fan for a period required for transporting the container, and has the advantage of a portability thereof.

The container may have a timer means for limiting the operation of the fan to a predetermined time after the determination that the calculated change is larger than a predetermined value is obtained, or a humidity sensor for detecting humidity in the container can be provided. This eliminates an unnecessary operation of the fan, which advantageously increases the life of the battery used for operating the fan.

BRIEF DESCRIPTION OF THE ATTACHED DRAWINGS

FIG. 7 shows relationships between dates and temperature values, which are combinations of FIGS. 4 to 6;

Figure 9:
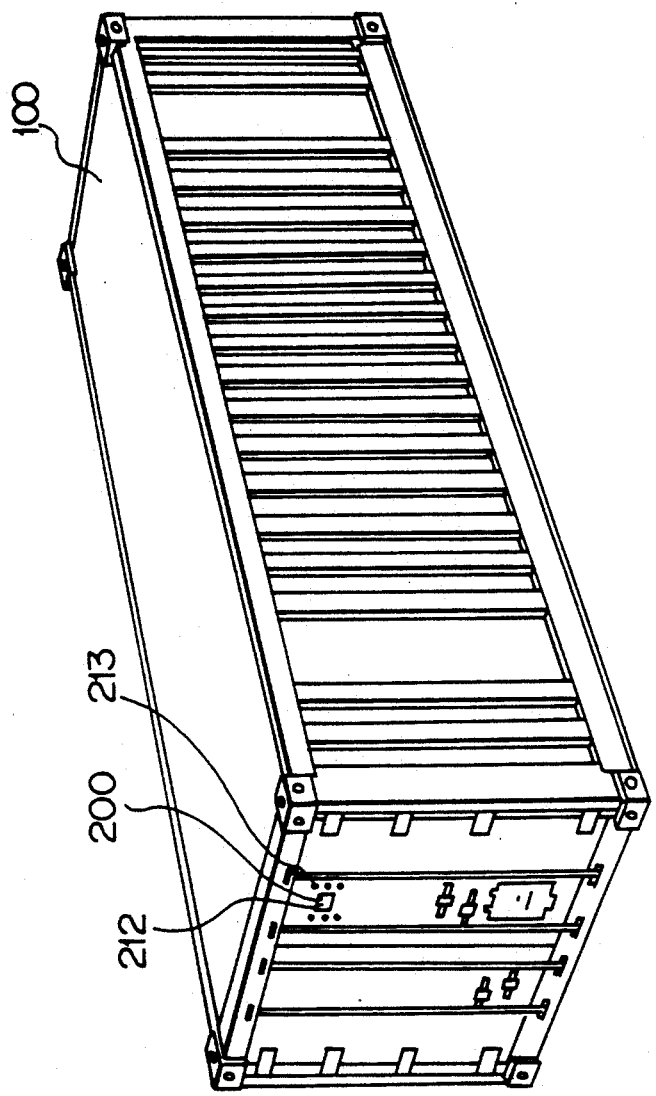

FIGS. 8(a) to (d) show, with respect to time lapsed, temperature values, values of a difference between the wall temperature and the inside temperature, humidity, and accumulated dew condensation time, respectively;

FIG. 9 is a perspective view of a container according to the present invention.

Figure 10:
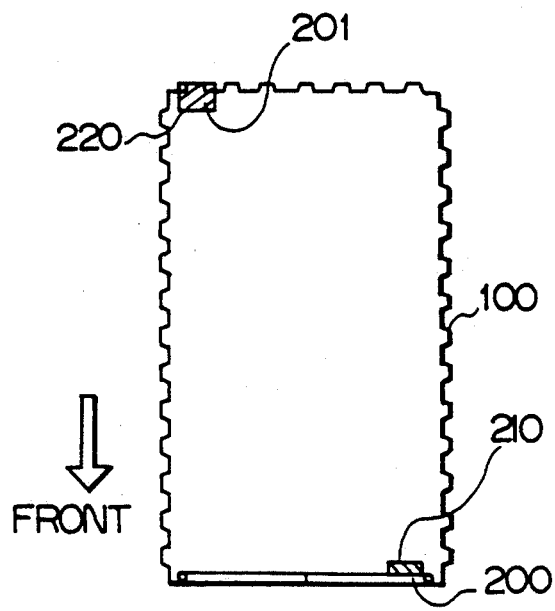
Figure 11:
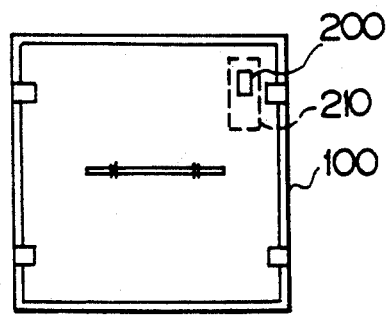
Figure 12:
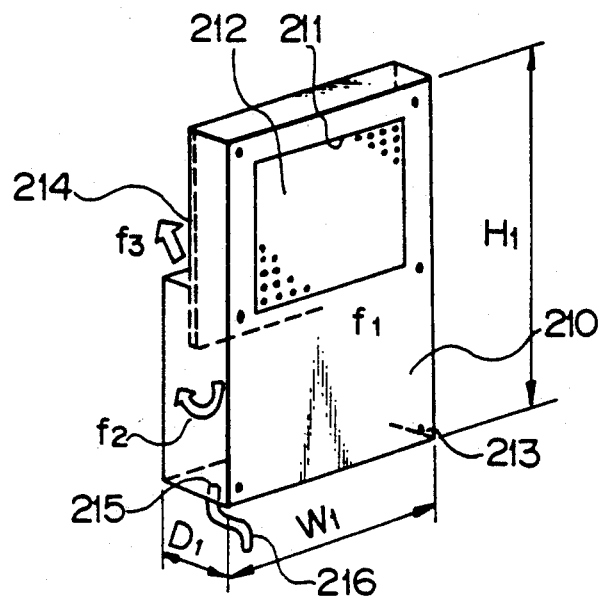
Figure 13:
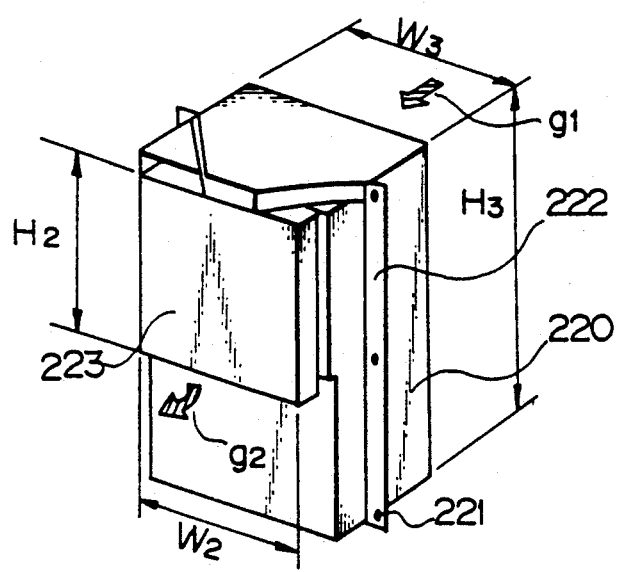
Figure 14:
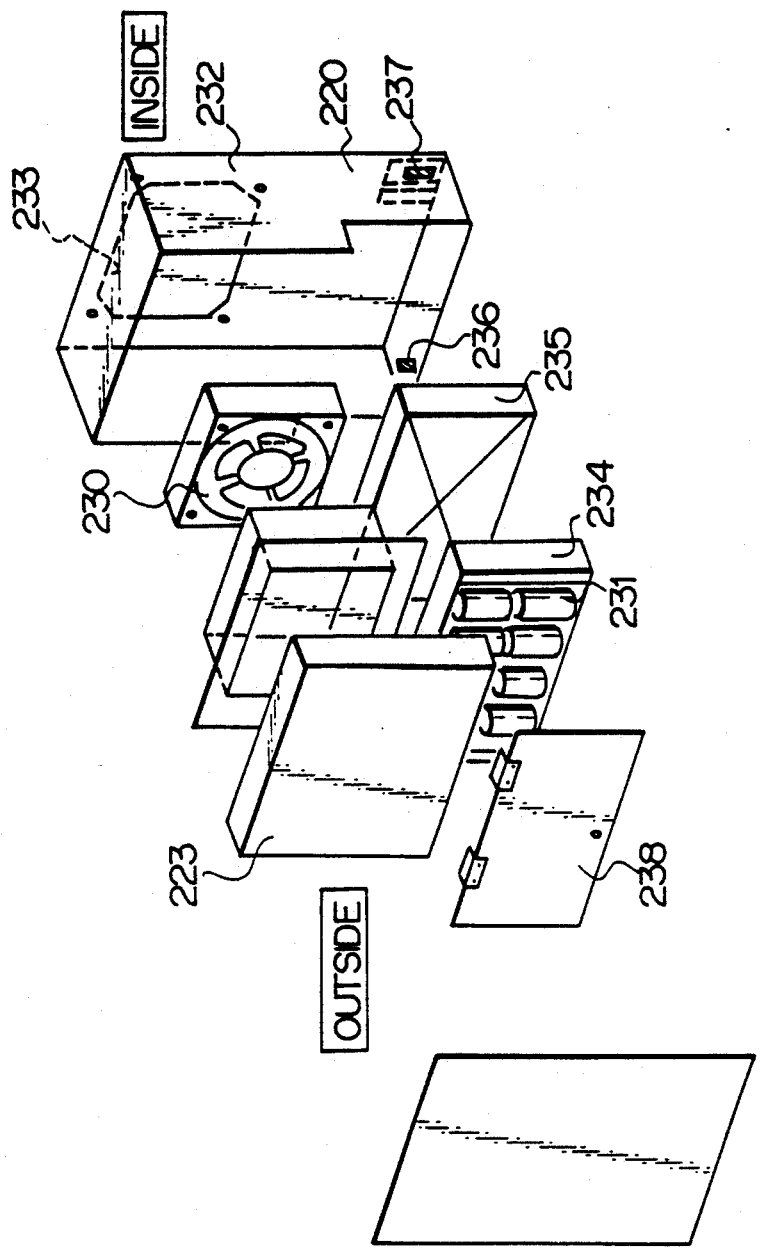
Figure 15:
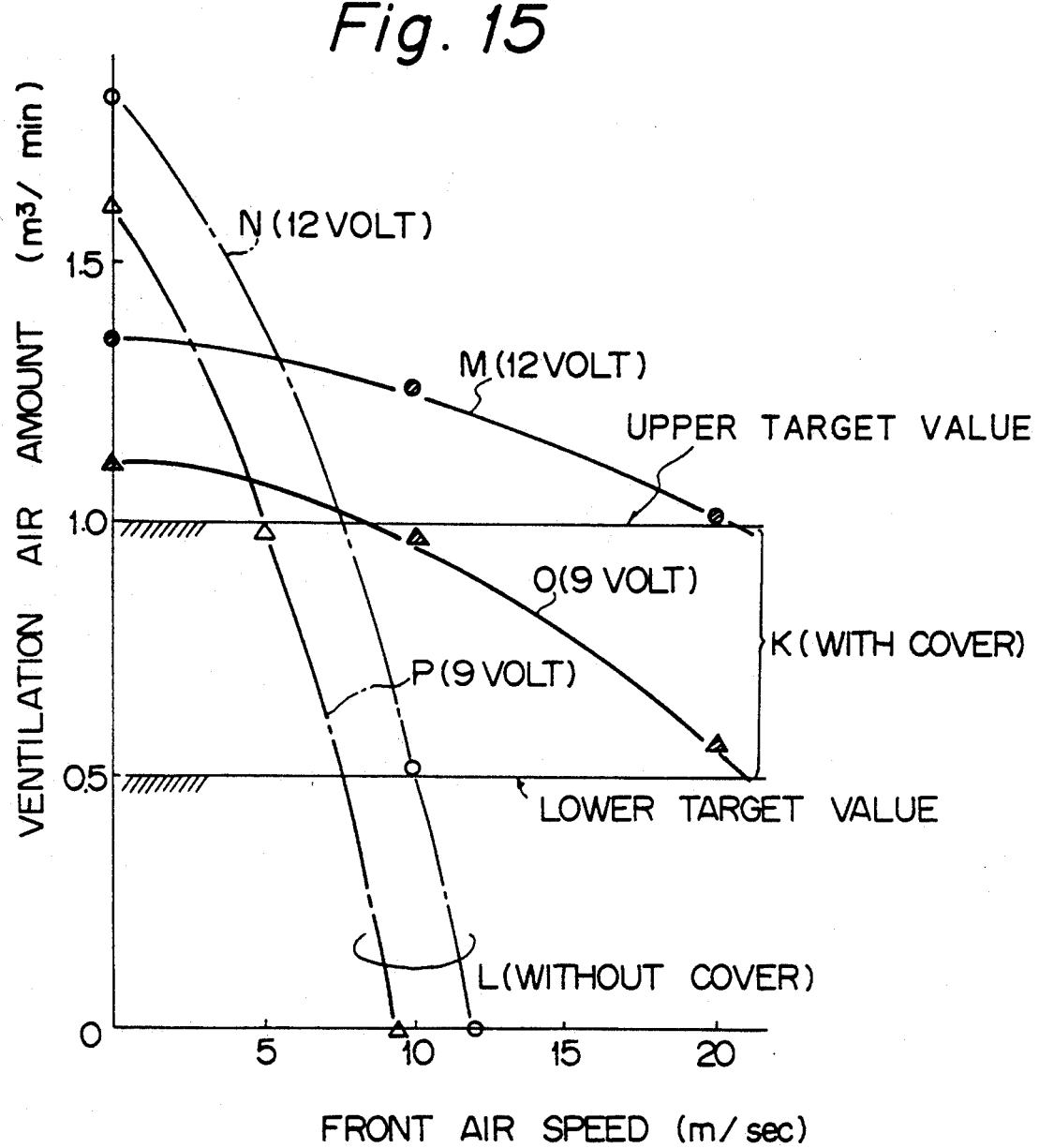

FIG. 10 illustrates an arrangement of air intake and exhaust units in an embodiment of the present invention;

FIG. 11 show an example of an air intake unit when connected to a container;

FIG. 12 is a perspective view of an air intake unit as one embodiment of the present invention;

FIG. 13 is a perspective view of an air exhaust unit as one embodiment of the present invention;

FIG. 14 is a dismantled perspective view of the air exhaust unit shown in FIG. 13;

FIG. 15 shows relationships between air flow speed to the front part of a container and amount of ventilated air.

Figure 16:
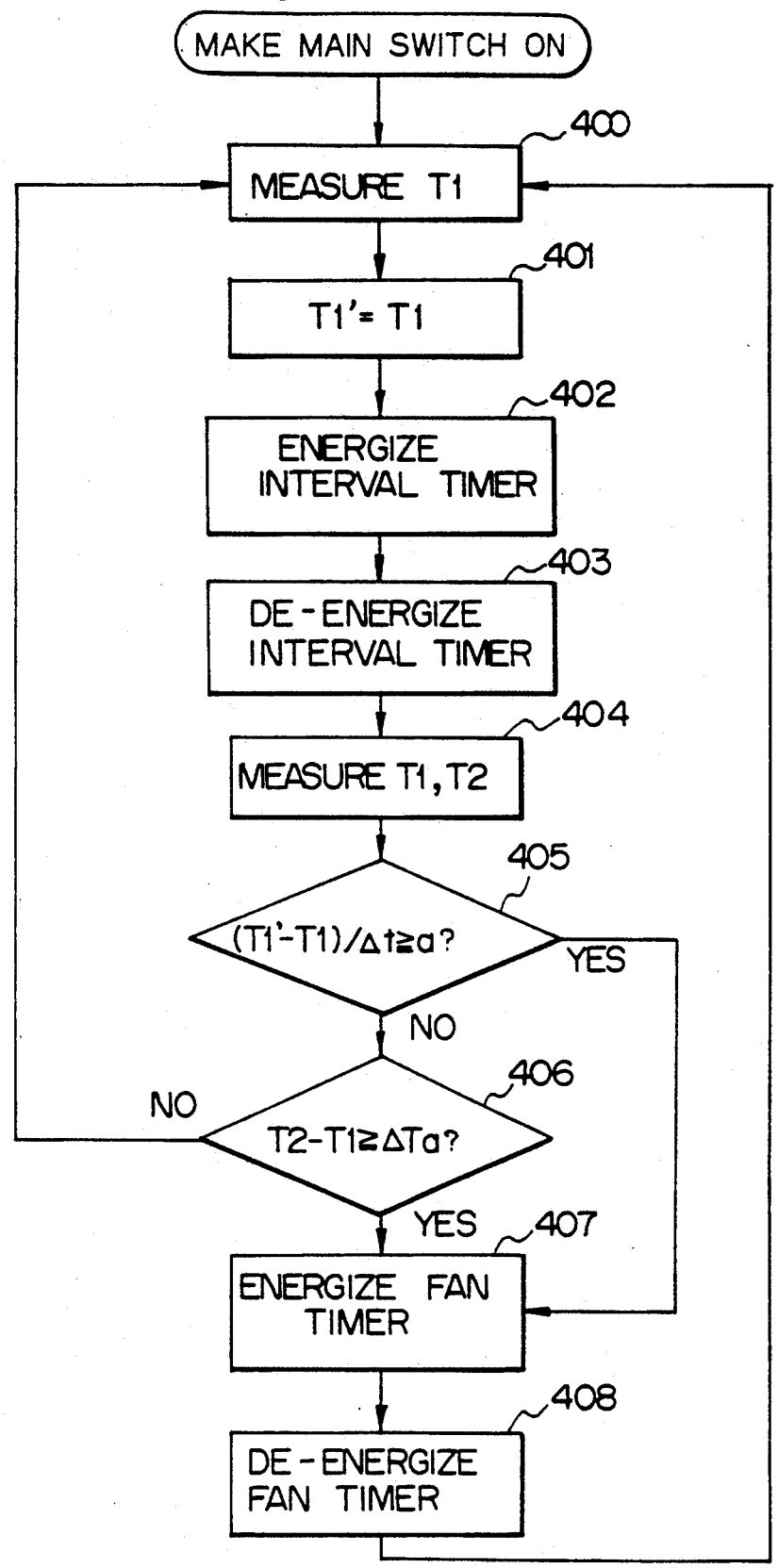
Figure 17:
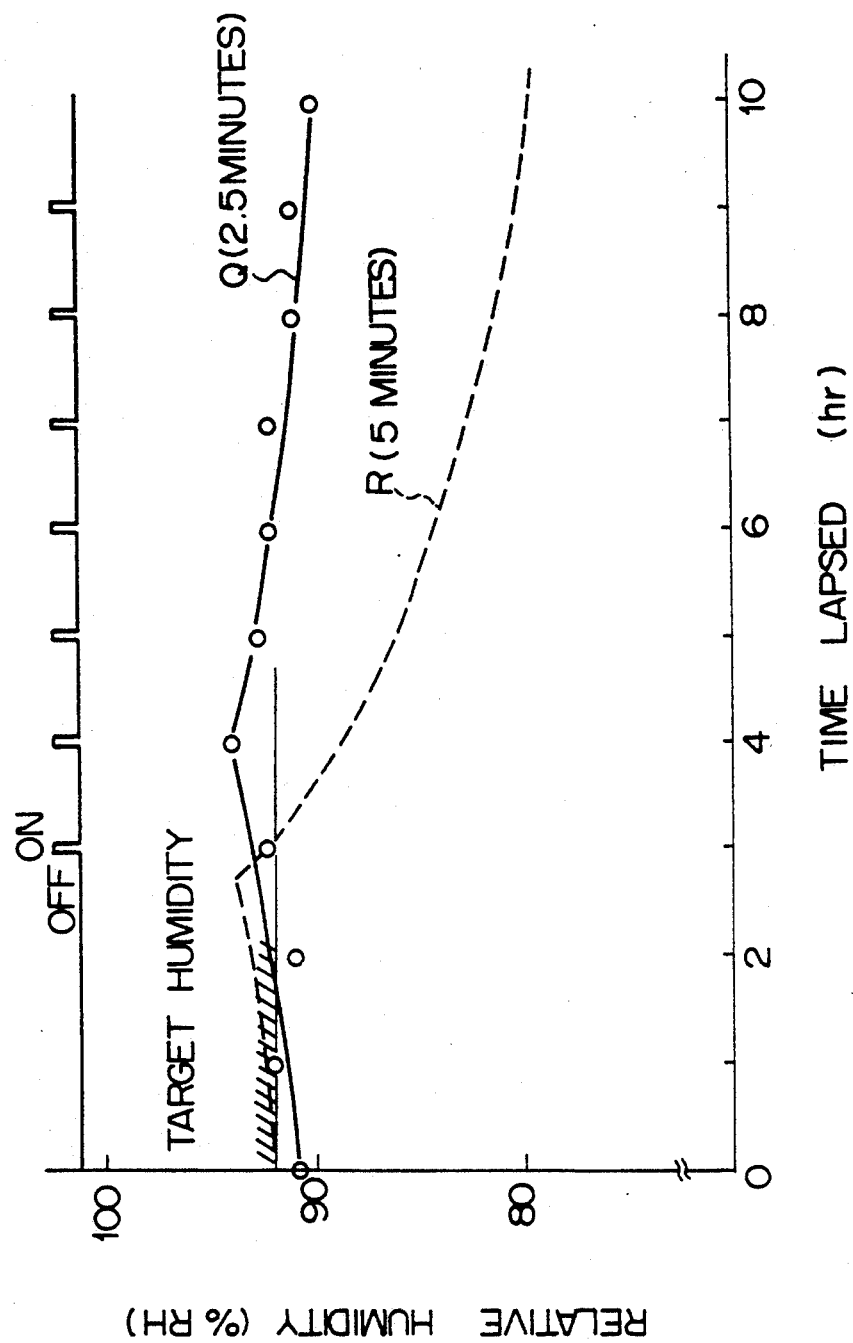
Figure 18:
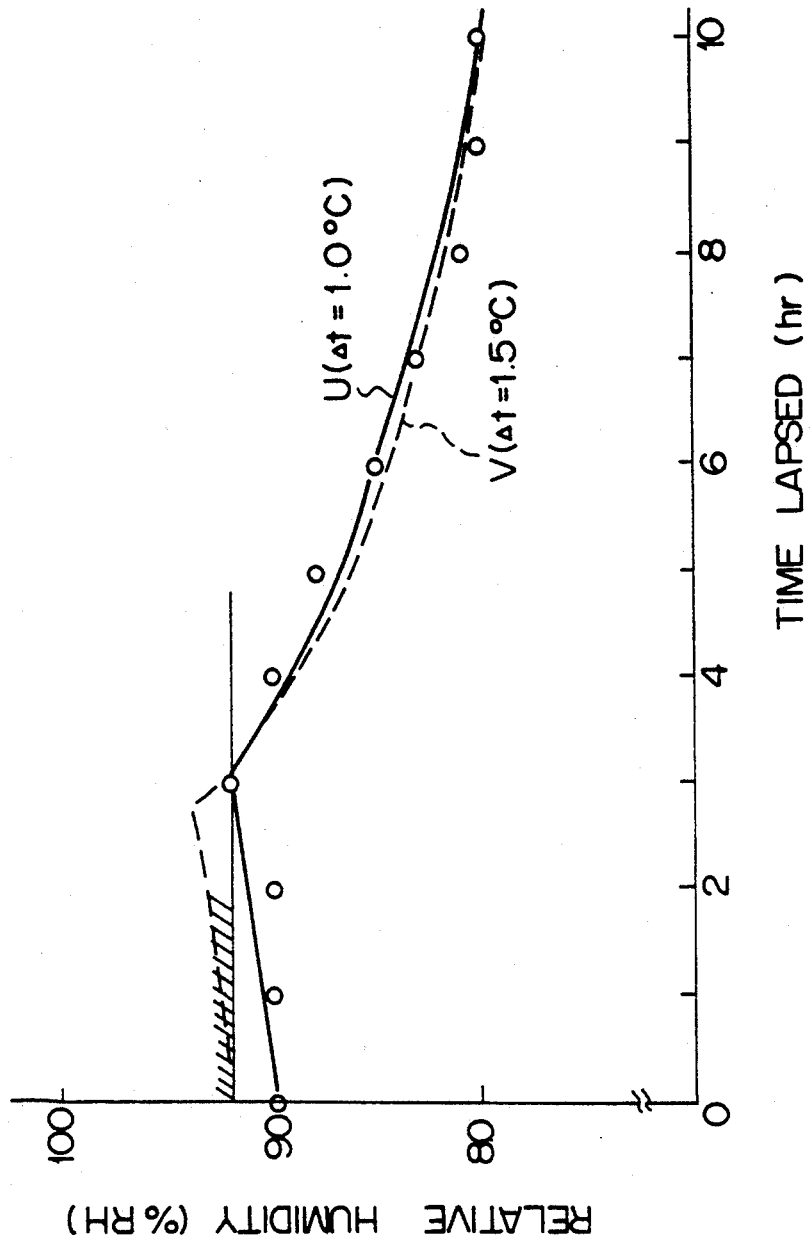
Figure 19:
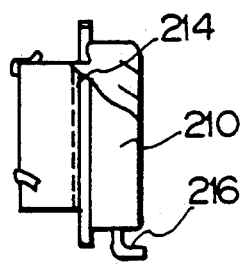
Figure 20:
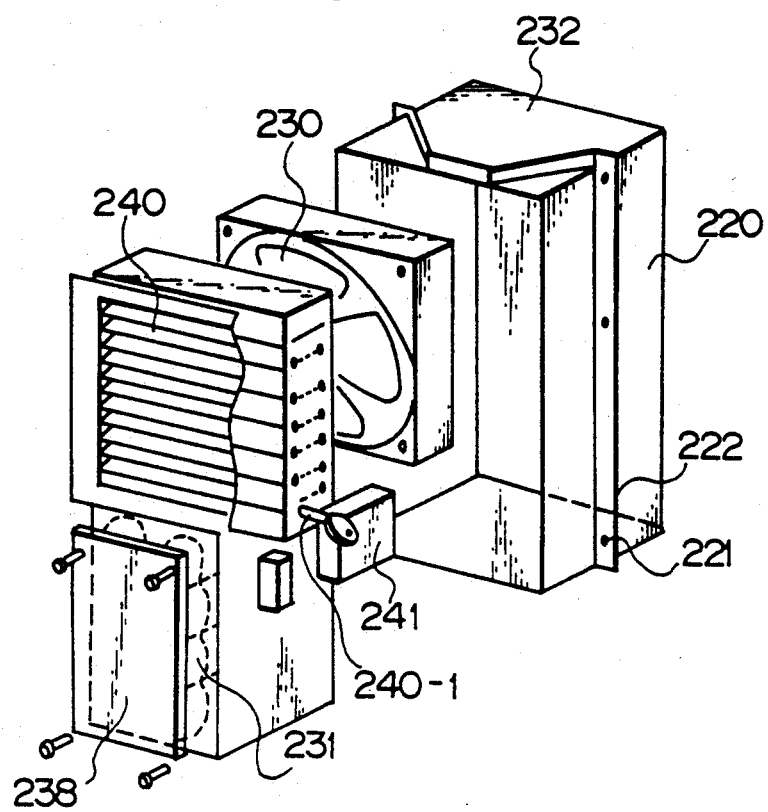
Figure 21:
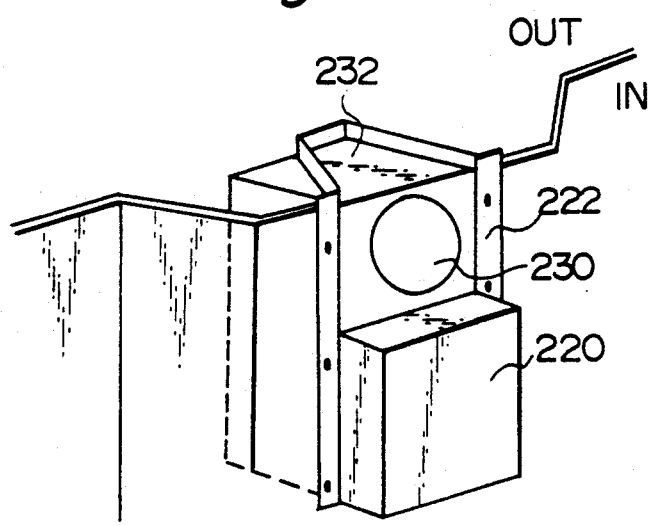
Figure 22:
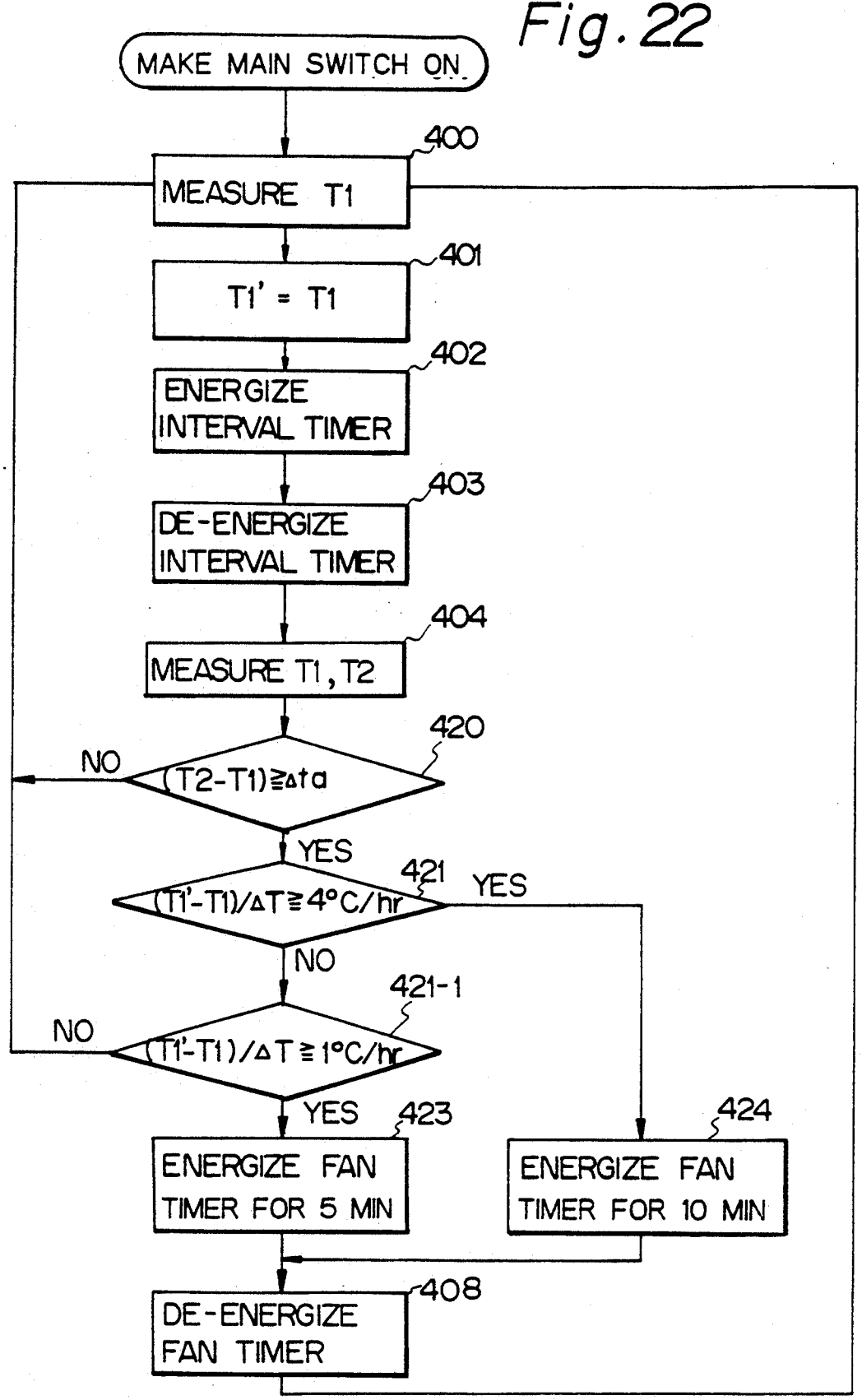
Figure 23:
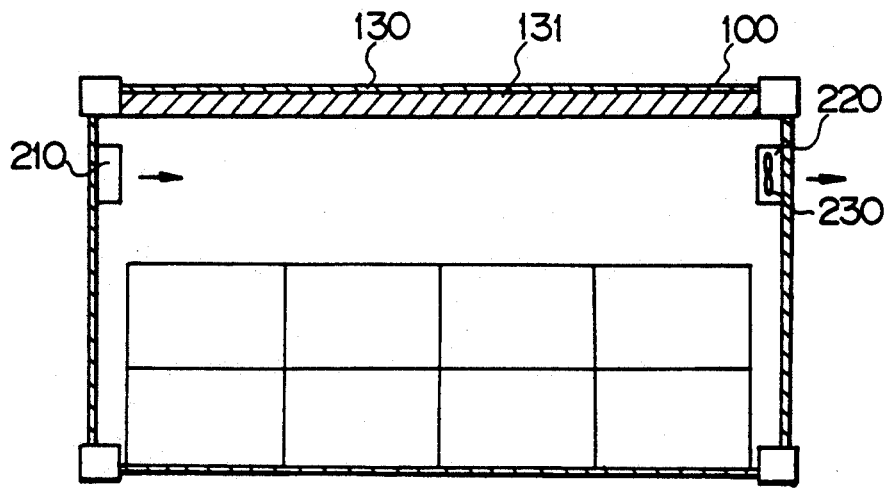
Figure 24:
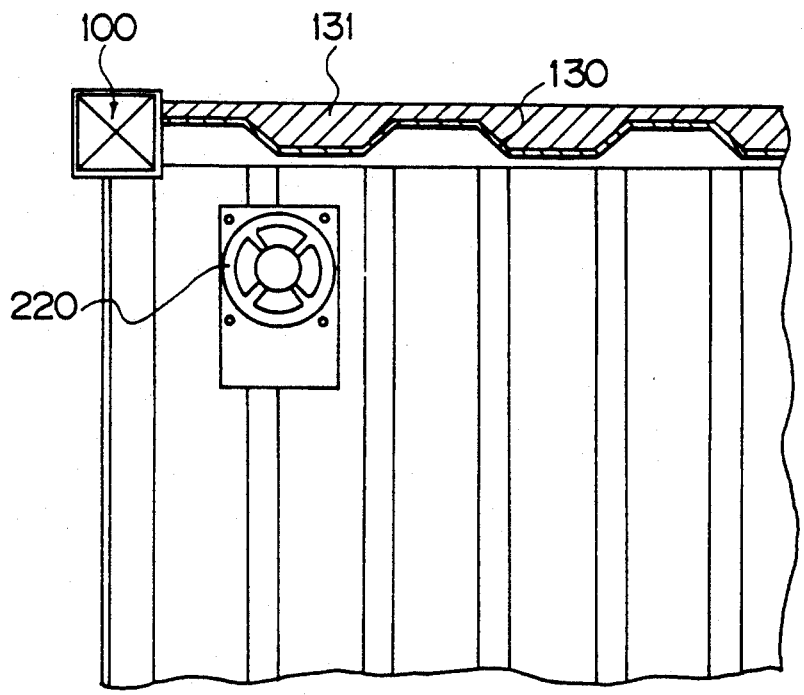

FIG. 16 is a flow chart illustrating an operation of the ventilation apparatus as one embodiment;

FIG. 17 shows relationships between time lapsed after the commencement of the operation of a fan and humidity in a container with respect to different operating times of the fan;

FIG. 18 shows relationships between time lapsed after the commencement of the operation of a fan and humidity in a container with respect to different values of a difference between the wall temperature and inside air temperature;

FIG. 19 is a side elevational view of an air intake unit as another embodiment of the present invention;

FIG. 20 is a dismantled perspective view of an air exhaust unit as another embodiment of the present invention;

FIG. 21 is a perspective view illustrating a connection of the air exhaust unit shown in FIG. 20 to a wall of the container;

FIG. 22 is a flow chart illustrating an operation of the ventilation apparatus as another embodiment;

FIG. 23 is a schematic cross-sectional view of a container as another embodiment having an upper heat insulating layer;

FIG. 24 is a partial front elevational view of a container according to another embodiment of the present invention.

Figure 25:
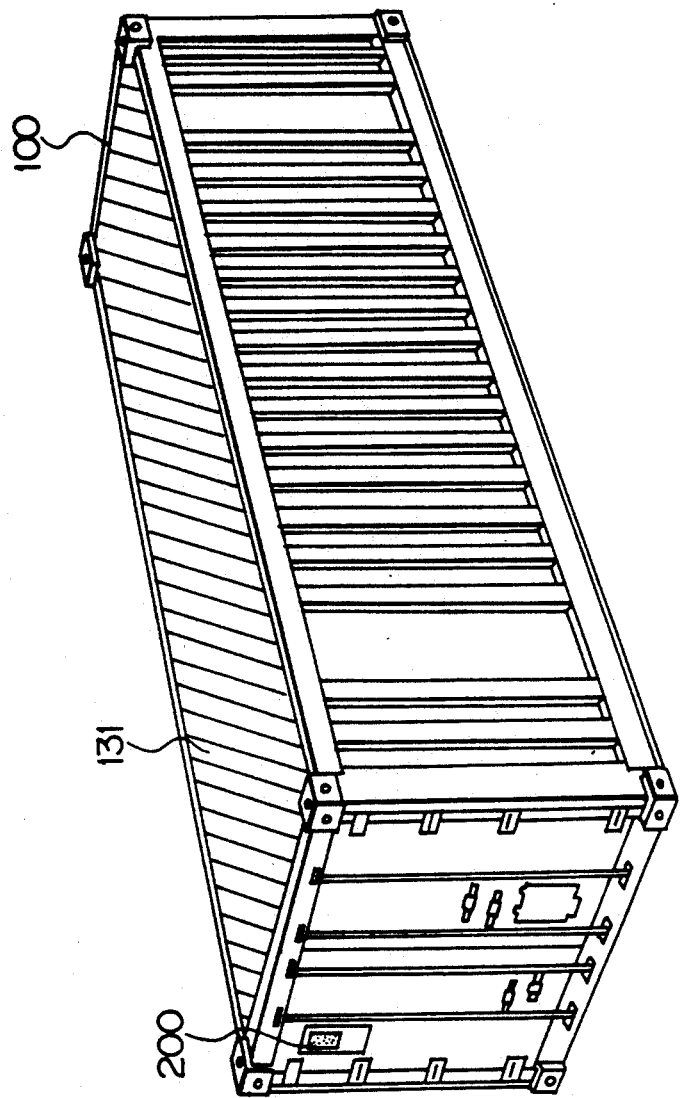
Figure 26:
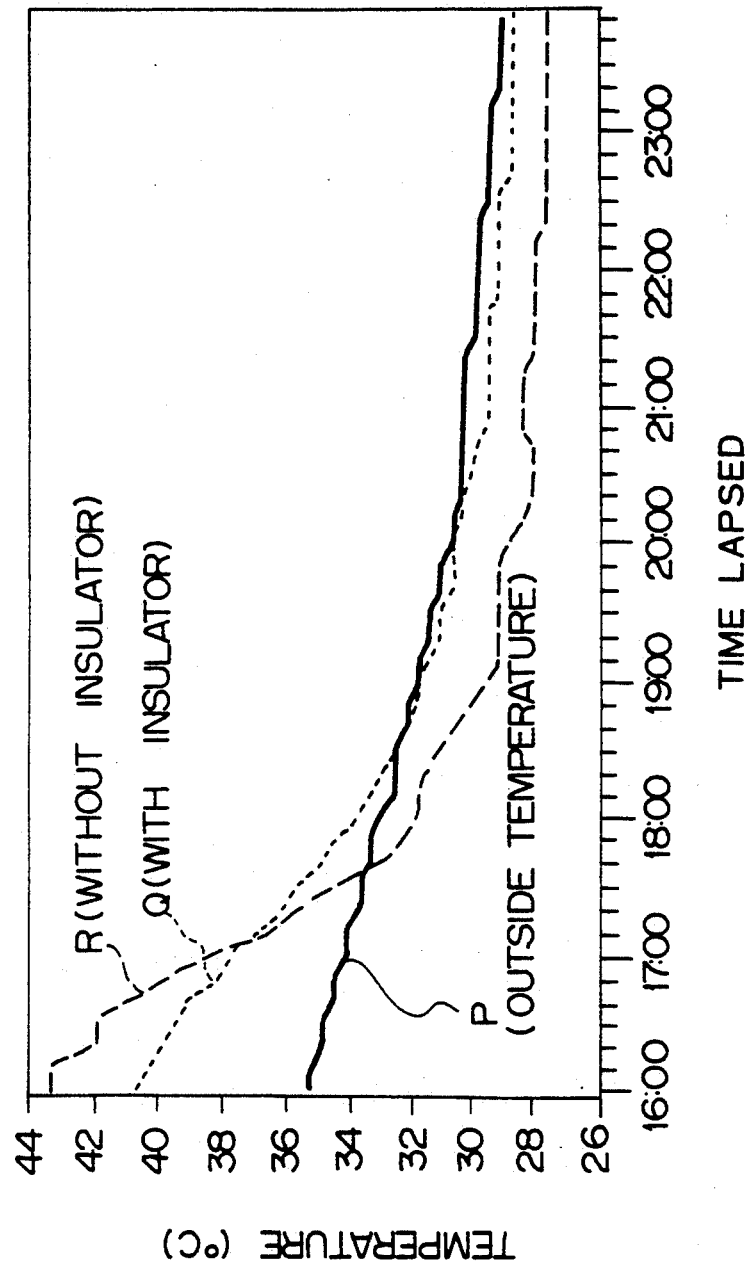
Figure 27:
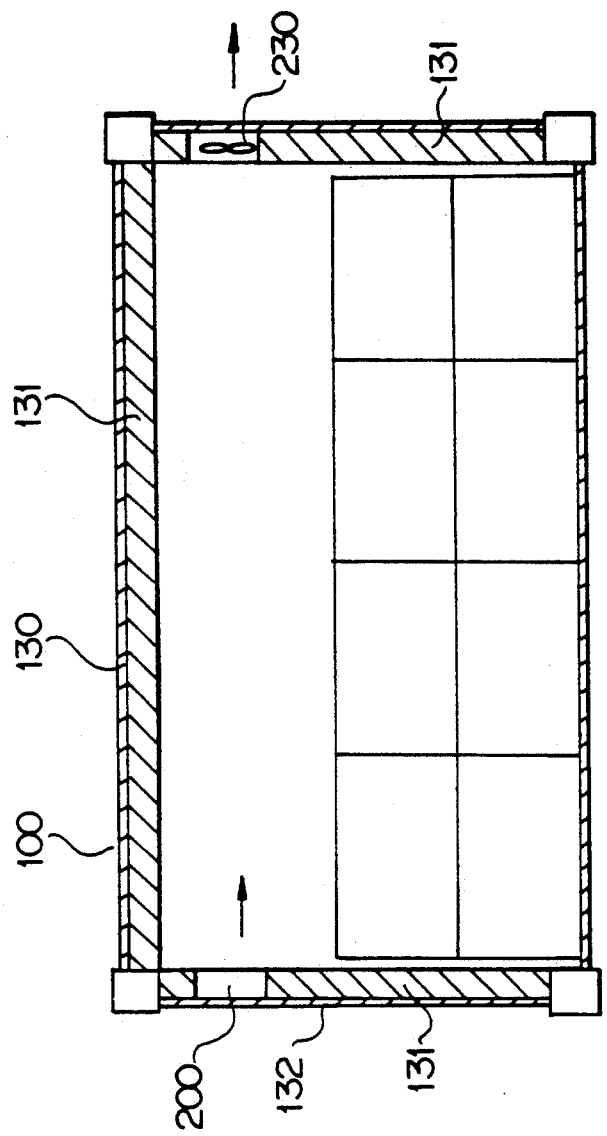
Figure 28:
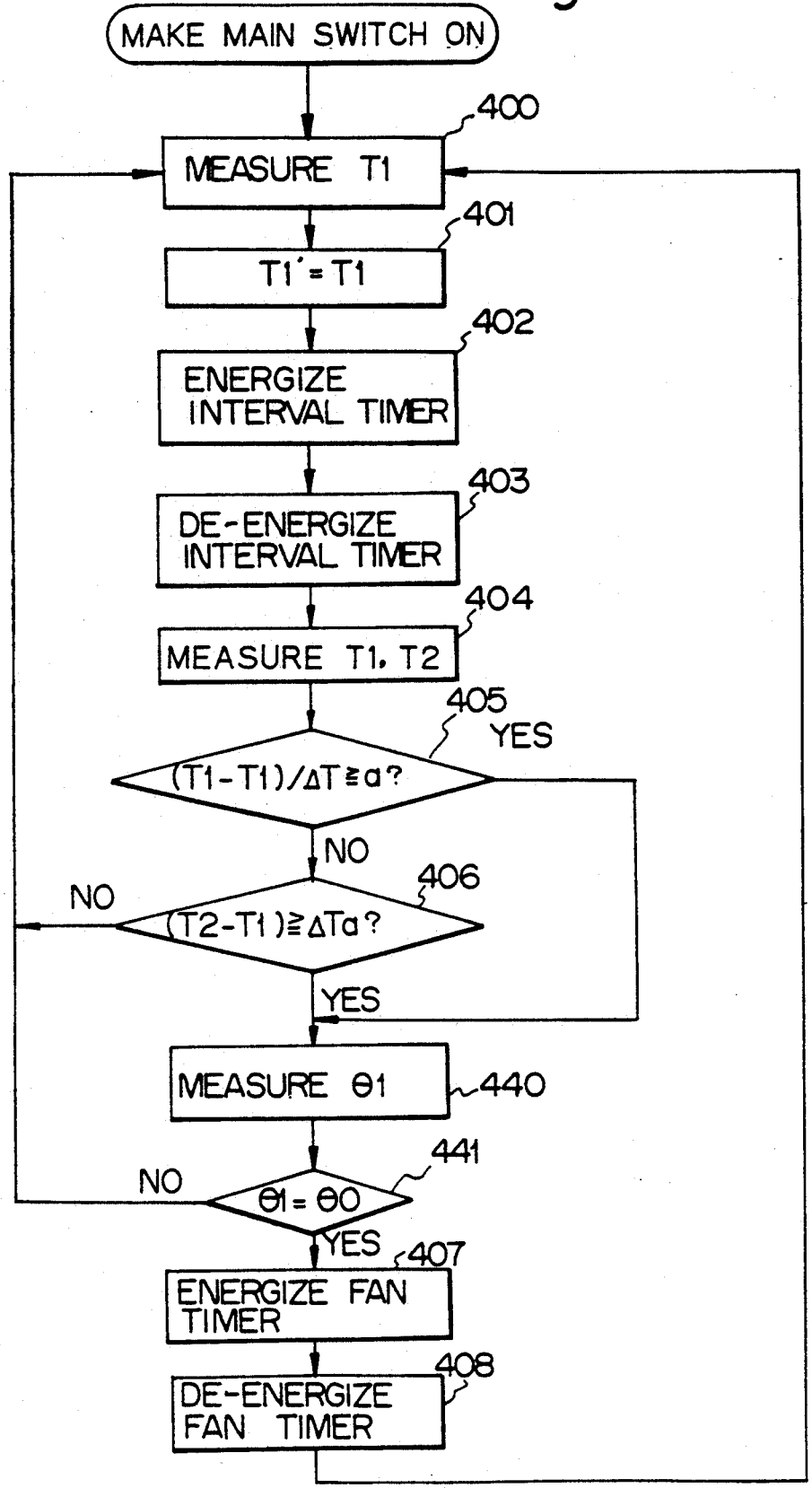

FIG. 25 is a perspective view of a container according to another embodiment;

FIG. 26 shows relationship between a time at night and the wall temperature, with an insulator and without an insulator, respectively;

FIG. 27 is a schematic cross-sectional view of a container as another embodiment; and FIG. 28 is a flow chart illustrating an operation of the ventilation apparatus as another embodiment.

DESCRIPTION OF THE PREFERRED EMBODIMENTS

Figure 1:
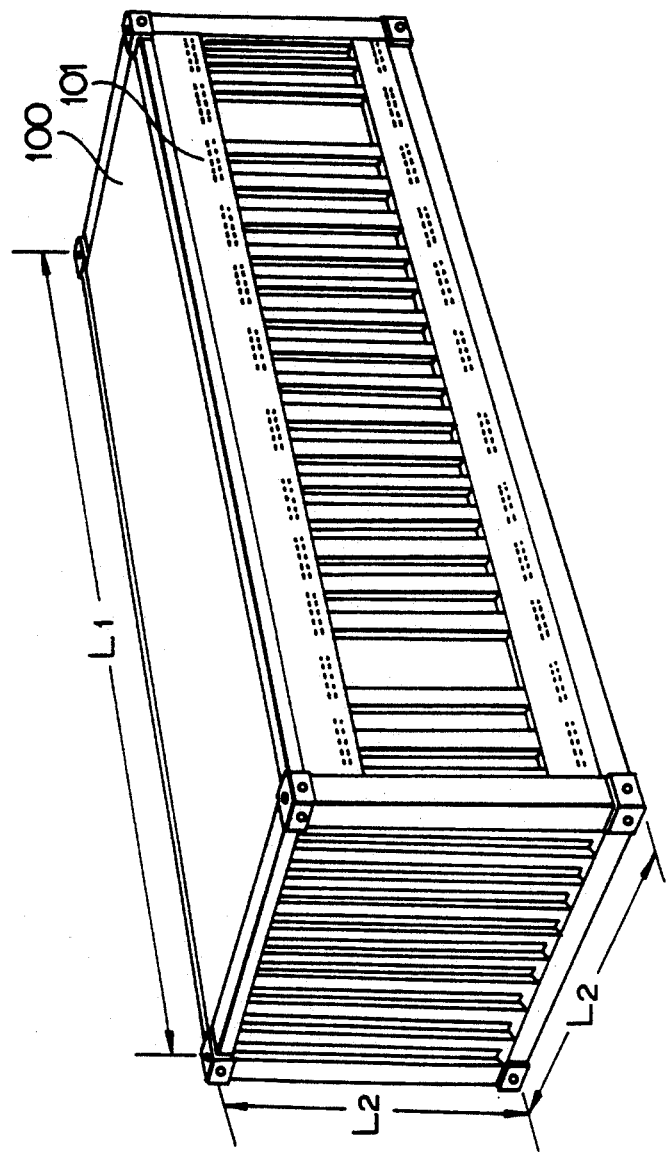
FIG. 1 is a perspective view of a prior art container.
Figure 2:
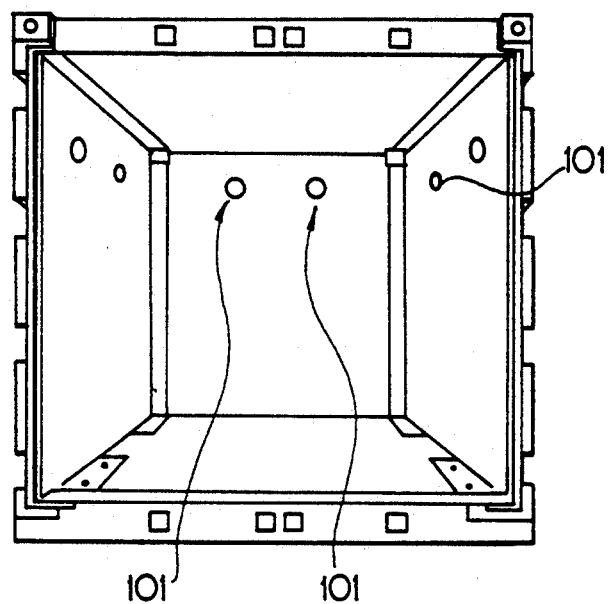
FIG. 2 is a view of an inside of the container shown in FIG. 1.

FIGS. 1 and 2 show a prior art construction of a container. Such a container 100 has, according to the international regulations, a long side length $L_1$ of 6 meters or 12 meters, and a short side length $L_2$ of about 2.5 meters. The container 100 has a predetermined inner volume, and has an outer wall made of metal material, and due to the construction of the container dew condensation is easily generated therein. One solution for preventing the dew condensation is to provide a means of controlling the temperature or humidity therein, or to provide ventilation holes 101 in the side walls of the container 100, to obtain a ventilation thereof, or to laminate a disposable anti-wetting sheet or desiccant on the inner surfaces of the container 100, to eliminate the moisture inside the container 100. These solutions provided by the prior art, however, do not fully prevent an occurrence of dew condensation, and are expensive.

Figure 3:
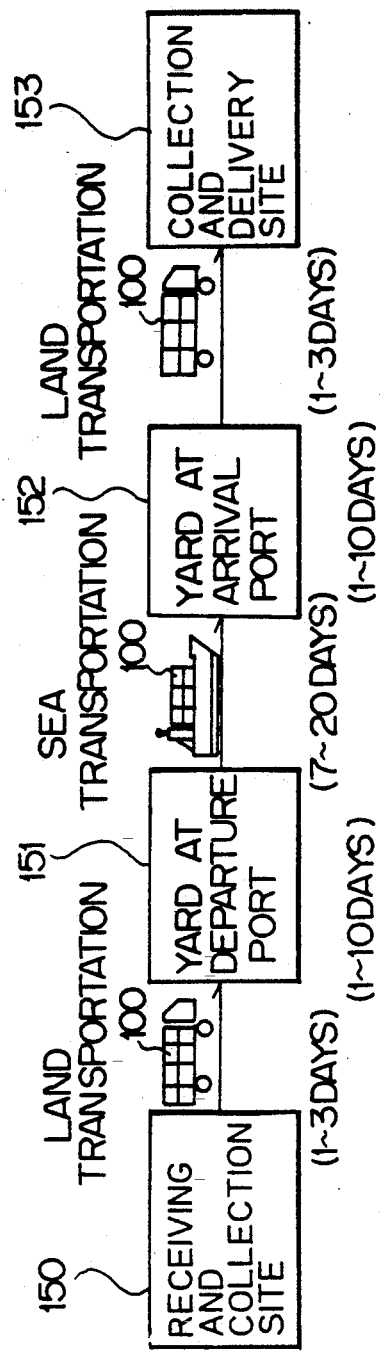
FIG. 3 is a diagram illustrating a typical container transportation system.

FIG. 3 illustrates a test, carried out by the present inventors, to determine how the dew condensation occurs in a container when transported. The transportation of goods by a container is usually done as follows. Initially, at a receiving and collection site 150, the goods are loaded into containers 100 which are loaded onto a truck. The truck conveys the containers 100 to a yard 151 in a departure port, and the containers are kept at the yard 151 for from 1 to 10 days. Then, the containers 100 kept at the yard 151 are loaded onto a ship, and, after transportation by sea for from 7 to 20 days, the ship arrives at an arrival port and the containers are moved to the yard 152, whereat the containers are loaded onto a truck and delivered to a collection and delivery site 153, where the goods are taken out of the containers.

Figure 4:
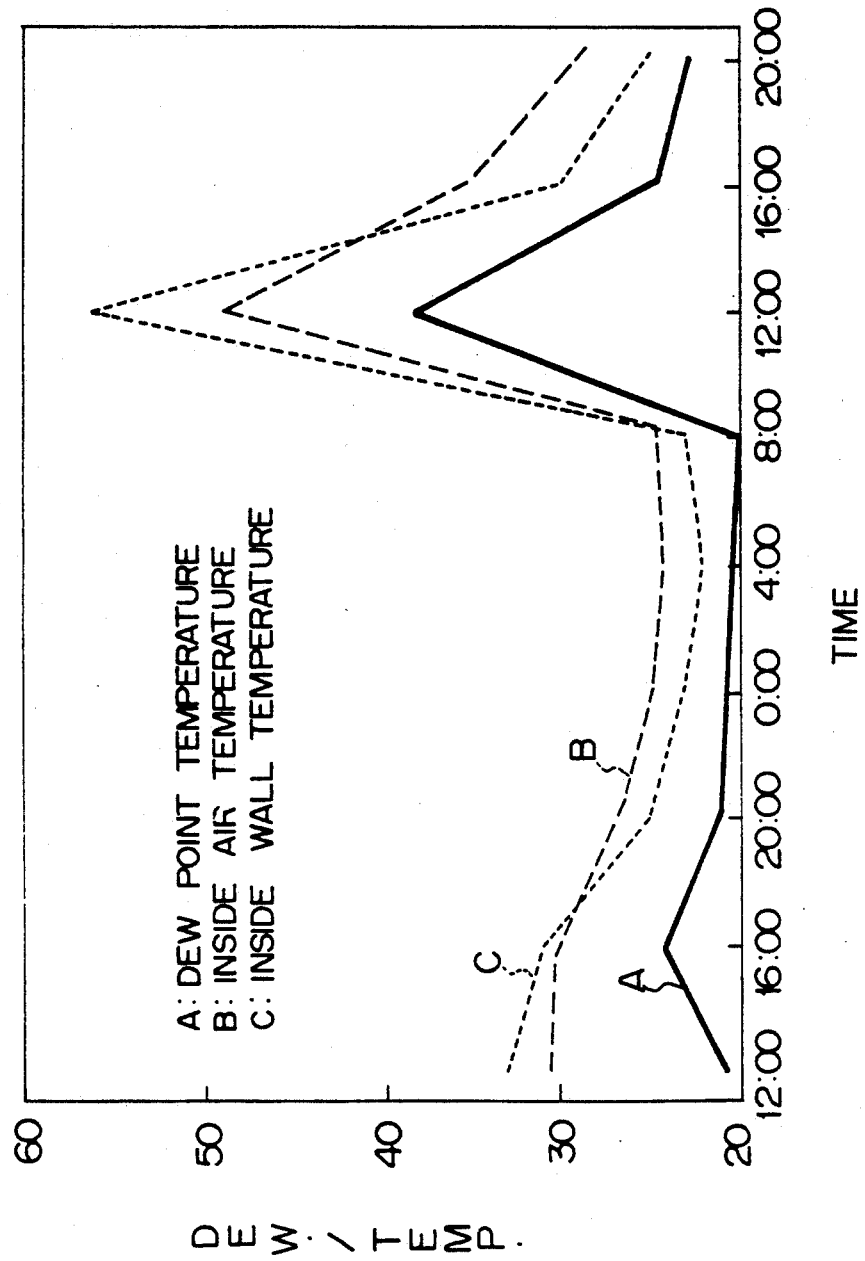
FIG. 4 shows relationships between a time of day and temperature values at various locations in a container at a yard in a departure port.
Figure 5:
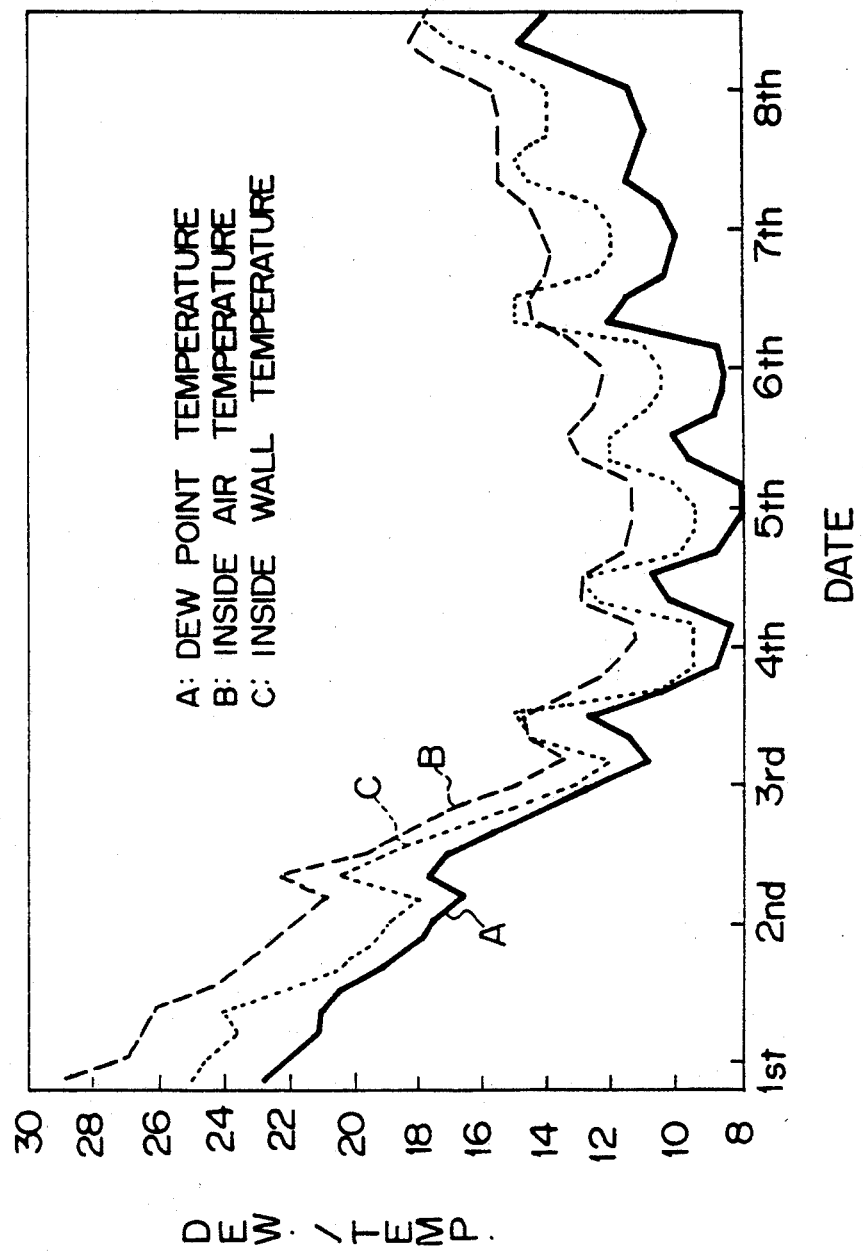
FIG. 5 shows relationships between dates and the temperature at various locations of a container during a transportation by sea thereof.
Figure 6:
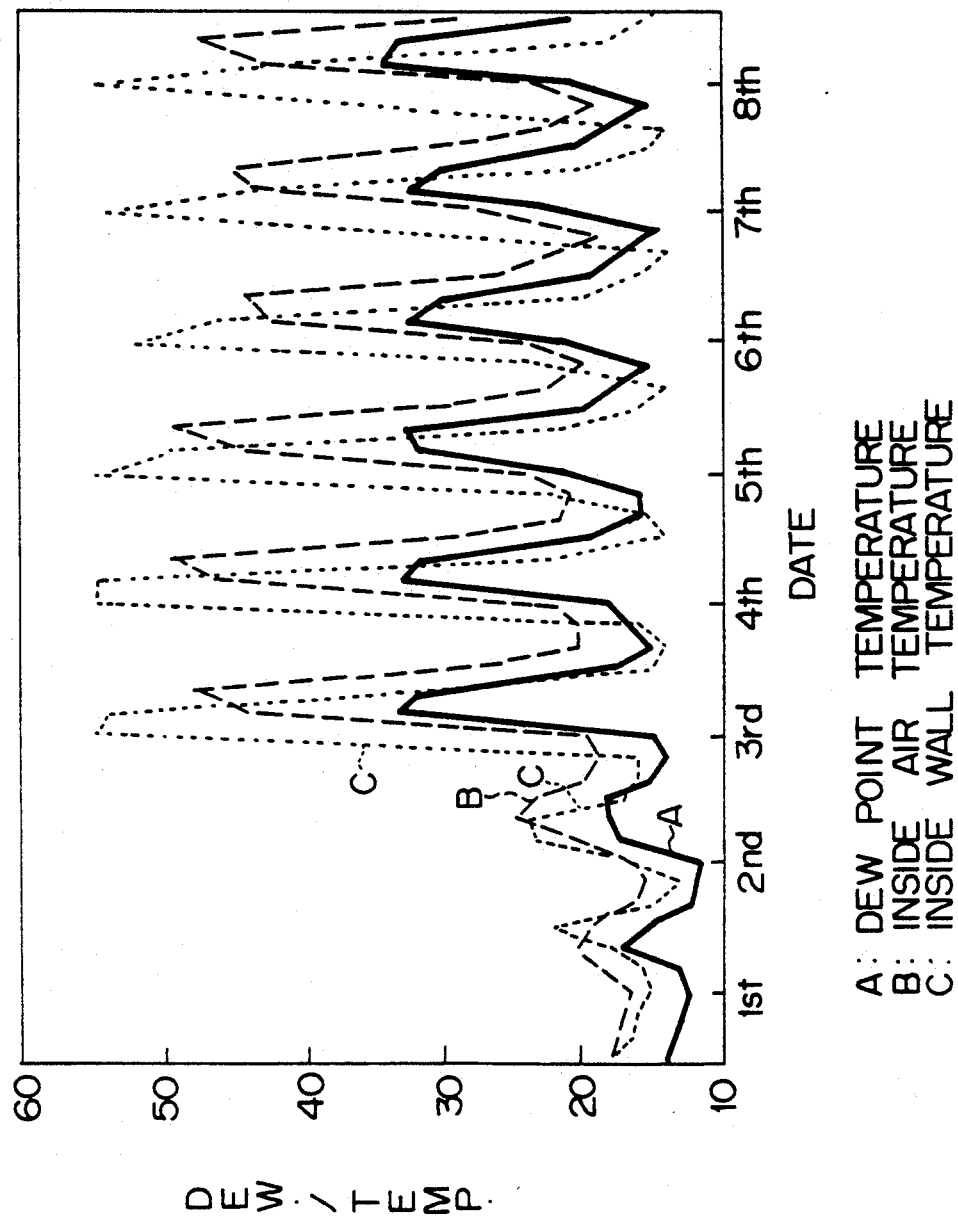
FIG. 6 shows relationships between dates and the temperature at various locations of a container when transported overland.

FIG. 4 to 6 illustrate how the temperature inside a container changes during the transportation of the container 100. FIG. 4 shows a change in the temperature inside a container 100 over a time lapsed after the container is conveyed to the yard 151. In FIG. 4, an abscissa is time lapsed (hours) from 12:00 noon of a day at which the container is delivered to the yard 151 to 20:00 at night of the next day, and the ordinate indicates the temperature. A solid line A designates a change in the temperature at the dew point, a dotted line B shows the temperature of the air inside the container, and a dotted line C shows the temperature at the wall inside the container 100. As will be easily understood, there is a large change in temperature not only inside the container but also at the wall of the container. It should be noted that the measurements shown in FIG. 4 were made during hot weather.

FIG. 5 shows a change in the temperature of the air inside the container and the temperature at the inner wall of the container during the transporting thereof from the yard 151 at the departure port to the yard 152 at the arrival port. In FIG. 5, the abscissa shows days. Eight days elapse from time of leaving the yard 151 at the departure port to arrival at the yard 152 at the arrival port. As will be easily seen, the difference in the temperatures on different days, caused by differences in the temperature between locations at sea, is much larger than the differences in the temperature at different times of a day.

FIG. 6 shows changes in the temperature in a truck moving from the yard 152 at the arrival port to the collection site 153 for distribution. As will be understood, it takes eight days for the containers to be moved from the yard 152 at the arrival port to the collection site 153 for distribution. As will be seen, there is a large day-to-night difference in the temperature in one day for the third to eighth days.

FIG. 7 shows a change in the temperature over the entire transporting process from the collection site 150 for reception to the collection site 153 for delivery, as separately shown in FIGS. 5 to 7. An abscissa shows a lapse of days, wherein a period D corresponds to a period wherein the container is at the yard 151 at the departure port, E corresponds to a period wherein the container is transported by sea. Furthermore, the period F corresponds to a period wherein the container is transported from the yard 152 at the arrival port. As easily understood from FIG. 7, there is a large change in the temperature of the air or temperature at the inner wall of the container 100 while the container is transported. This is because the container 100 does not have a temperature-sealed construction, and the container passes through locations at which it is apt to be subjected to large temperature differences.

As well known, dew condensation inside the container is generated when the temperature of the air inside the container falls below the dew point, i.e., the large change in the temperature causes dew condensation to be easily formed in the container 100. Furthermore, a quick drop in the temperature causes the determination of the dew condensation in the container to be inaccurate when only the air temperature inside the container or surface temperature at the inner wall of the container is measured. Namely, after an actual dew condensation has already occurred before the dew condensation condition is actually determined by detecting the air temperature in the container or the surface temperature at the inner wall of the container.

This phenomenon is further explained with reference to FIG. 8, which schematically illustrates a model temperature condition in a container, made from actual temperature changes in the container when the volume of the container 100 is 16 m$^3$, the atmospheric humidity is 90% RH, and an initial inside humidity is 90% RH. The change in the temperature of the outside air as shown by a line G in FIG. 8(a) caused the temperature at the surface of the inner wall of the container to be changed as shown by a line C, wherein a variation in the temperature at the surface of the inner wall of the container as shown by the line C is larger than the variation in the outside temperature as shown by the line G, because a variation in the temperature at the surface of the inner wall of the container is influenced not only by the outside temperature G but also by a radiated heat from, e.g., solar radiation. In accordance with the change in the inner wall temperature of the container C, the air temperature inside the container is changed as shown by a line B. The air temperature inside the container B does not change as rapidly as the surface temperature at the inner wall of the container C, but the degree of change in the air temperature inside the container B over a unit of time is much larger than that of a change in the air temperature inside a house having a usual type of heat insulating walls. Therefore, a rapid drop in the wall temperature inside the container C as shown by an area H in FIG. 8(a) causes the relative humidity inside the container to become 100%, even if the detected air temperature B inside the container is lower than the surface temperature C at the inner wall of the container, resulting in a generation of dew in the air inside the container.

A signal from a temperature sensor is usually used to determine a formation of dew on an inner wall of the container, when it is detected that the temperature at the inner wall of the container, C is lower than the temperature of the air in the container, B as shown by a section I in FIG. 8(a). FIG. 8(b) shows a difference between an inside air temperature and the wall temperature. A zone designated by J with shaded lines in FIG. 8(b) of a Δt value larger than a predetermined value of 1.0° C. is an area at which it is considered that dew condensation is generated. Nevertheless, the rapid drop in the wall temperature C inside the container, as explained above, may cause the determination of the dew condensation to be delayed until the condition I is actually obtained, which causes the dew condensation to be promoted, and the goods inside the container to become wet.

Therefore, to effectively prevent an occurrence of dew condensation, it is necessary to predict the condition at which the dew condensation easily takes place, by measuring a degree of drop in the wall temperature inside the container larger than a predetermined value. Furthermore, in addition to measuring the change in the wall temperature of the container, to predict the dew condensation condition, it is also effective to evaluate the dew condensation condition by determining the difference between the wall temperature C and the temperature inside the container B.

Now, embodiments of the present invention will be described. The container 100 (FIG. 9) in which the ventilation device according to the present invention is employed is substantially the same as the container of the prior art, except that it is provided with an intake opening 200 and an outlet opening 201 as shown in FIG. 10. As shown in FIG. 9, the container 100 has a substantially rectangular parallelepiped shape having a front wall and rear wall, and an inlet opening 200 is formed at the upper part of the front door in the front wall of the container 100, and an exhaust opening 201 is formed in the rear wall of the container 100 at a position diagonally opposite that of the intake opening 200. As shown in FIG. 11, both the intake opening 200 and the outlet exhaust 201 are located at the upper part of the container, thereby reducing any influence thereon by the goods loaded in the container, as much as possible.

FIG. 12 shows an intake unit 210 mounted at the intake opening 200 and constructed by a sheet made of a metal material having an anti-corrosion coating thereon, to thereby form an intake passageway 211 opposite to the opening 200 formed in the front wall of the container 100. The intake passageway 211 has, for example, a regular square shape having sides with a length of 16 centimeters. A perforated sheet 212 punched from a metal material is connected to the intake unit 210 such that the sheet 212 extends across the flow of air in the passageway 211, to thereby prevent an entry of impurities to the inside of the casing 100.

The intake unit 210 has a height $H_1$ of about 50 centimeters, a width $W_1$ of about 20 centimeters, and a thickness $D_1$ of about 5 centimeters, and has bores 213 through which screws (not shown) are inserted for connecting the unit 210 to the front wall of the container 100. Furthermore, a baffle plate 214 is arranged on the downstream side of the passageway 212, so that the baffle plate 214 is downwardly spaced from the perforated sheet 212. As a result, even if rain water is introduced into the passageway, the baffle plate 214 directs the water downward toward a drain port 215 at the bottom of the unit. Conversely, the flow of air introduced into the intake passageway 212 by-passes the baffle plate 214, as shown by arrows $f_1$, $f_2$ and $f_3$. The drain port 215 at the bottom of the intake unit 210 is connected to a drain passageway 216 in the front wall of the container 100, whereby rain water in the drain port 215 is discharged to the outside of the container 100 via the drain passageway 216.

FIG. 13 shows an exhaust unit 220 arranged so that it covers the exhaust opening 201 shown in FIGS. 9 and 10. The exhaust unit 220, similar to the intake unit 210, is constructed by a metal plate having an anti-corrosion metal plating thereon, and is provided with bores 221 through which bolts are inserted for connecting the exhaust unit 220 to the rear wall of the container 100. The exhaust unit 220 has an outwardly directed flange member 222 in which the bores 221 are formed. The exhaust port 201 has a dimension slightly larger than that of the exhaust unit 220, whereby the exhaust unit 220 can be inserted to the exhaust port 201 and the flange 222 is engaged with the edge of the exhaust port 201 so that the exhaust unit 220 is partly opened outside of the container 100, while the flange 222 is connected to the rear wall of the container by the screws passing through the bores 221. The unit 220 is provided, at the outer side thereof, with a cover or baffle plate 223 preventing outside air from being directly blown into the exhaust opening 201. As will be described later, a fan is housed in the unit 220 for generating a ventilation flow, as shown by arrows $g_1$ and $g_2$. The cover 223 has a height $H_2$ of 18 centimeters and a width $W_2$ of 12 centimeters. The exhaust unit 220 has a height $H_3$ of 27 centimeters, and a width $W_3$ of 15.5 centimeters. It should be noted that front end of the unit 220 can be made flush with the rear wall of the container 100, which prevents damage to the unit 220 by accidental contact.

FIG. 14 shows a dismantled view of the exhaust unit 220, which includes a fan 230, dry batteries 231, and an inner casing 232. The inner casing 232 forms an exhaust passageway 233 opened to the inside of the casing 100, and the fan 230 faces the exhaust passageway 233. The fan 233 is electrically connected to the dry batteries 231, for supplying an electric power to the fan 230 to rotate same. The dry batteries 231 are housed in a battery casing 234 connected to the inner case 232. The exhaust unit 220 is further provided with a control unit 235 stored in the casing 232, which controls the fan 230 in response to electric signals from a wall temperature sensor 236 and a room temperature sensor 237.

According to this embodiment, the wall temperature sensor 236 is arranged in the case 232 such that it is in contact with the surface of the wall of the container 100 when the sensor 236 is connected to the wall. The sensor 236 can be mounted on a wall surface of the container 100 at a location at which the temperature change is the largest, such as the middle of the ceiling. The room temperature sensor 237 is also mounted in the casing at a location such that the sensor 237 is not subjected to a direct flow of air from the fan 230. The unit 220 is mounted on the rear wall of the container 100, and the control unit 235 and the battery case 234 are housed in the case 232. A cover 238 is provided for covering the case 234 storing the batteries 231. Furthermore, the cover 238 is removable when the case 234 is mounted to the unit 222, to allow the batteries 231 to be easily replaced from the outside of the container 100.

As already explained, the exhaust unit 220 is provided with a baffle plate or cover 223 for preventing a reverse flow of the outside air to the exhaust passageway 233. This is important to the maintaining of a desired ventilation operation by the fan 230. Namely, when the container 100 is loaded onto a truck or ship, the container 100 is subjected to an air flow caused by the movement of the truck or ship. Furthermore, when it is transported on the truck or ship, the container is directly exposed to the outside atmosphere, and thus the container is subjected to a natural wind flow. An introduction of air flow in the direction opposite to the direction of the flow generated by the fan 232 may worsen the ventilation operation by the fan 230. FIG. 15 illustrates the relationship between the speed of the air flow at the front side and the amount of air as ventilated. In FIG. 15, lines designated by K are obtained when the cover 223 is used to prevent the reverse flow directly onto the fan 230, and lines designated by L are obtained when cover is not provided and the reverse flow cannot be effectively prevented. A solid line M and dashed line N are obtained when the voltage level of the dry batteries 231 is 12 volts, and a solid line O and a dashed line P are obtained when the voltage level of the batteries has dropped to 9 volts. The voltage level of 12 volts is obtained just after new batteries are inserted, and the voltage level of 9 volts is the minimum voltage level at which the control unit 235 can be operated. As will be easily understood, when the cover 223 according to the present invention is not provided (lines N and P), the ventilation operation becomes poor when an air flow as applied is increased to about 10 meters per seconds. Contrary to this, the provision of the cover 223 according to the present invention (lines M and O in FIG. 15) permits a sufficient ventilation effect even if a flow of about 10 meters per seconds is applied to the front of the exhaust unit 220.

The operation of the control unit 235 will now be explained with reference to a flow chart shown in FIG. 16. As will be fully described later, the control is used for commencing the operation of the fan 230 when a quick change in the container wall temperature $T_1$ occurs or when the container wall temperature $T_1$ becomes lower than the inside container temperature $T_2$ by a predetermined value. The routine at the step 16 is commenced when a main switch is made ON, and at step 400 the container wall temperature $T_1$ from the sensor 236 is input, at step 401, the value of $T_1$ is memorized as $T_1$ at step 402 an interval timer is started, and at step 403, the interval timer is stopped after a predetermined interval $\Delta t$ has elapsed from the setting at step 402. After a predetermined time has elapsed, at step 404, the container wall surface temperature $T_1$ and the inside container temperature $T_2$ as measured by the sensors 236 and 237, respectively, are input. At step 405, a rate of change in the container wall surface temperature is calculated by, $(T_1'-T_1)/\Delta t$, and it is determined that the rate of change in the container wall surface temperature $(T_1'-T_1)/\Delta t$ is larger than a predetermined threshold value a. When it is determined that the rate of change in the container wall surface temperature $(T_1'-T_1)/\Delta t$ is smaller than a predetermined threshold value a, the routine goes to step 406 where it is determined whether the difference of the inside container temperature $T_2$ with respect to the container wall temperature $T_1$ is larger than a predetermined threshold value $\Delta T_a$. See FIG. 8(b). When the difference $T_2-T_1$ is smaller than the predetermined value $\Delta T_a$, i.e., when it is determined that the dew condensation condition does not exist, the routine returns to step 400 for a repetition of the above-mentioned step, and the ventilation of the container by the fan 230 is prohibited.

When it is determined that the rate of change in the container wall surface temperature $(T_1'-T_1)/\Delta t$ is larger than a predetermined threshold value a, or when it is determined that the difference $T_2-T_1$ is larger than the predetermined value $\Delta T_a$, the routine goes to step 407 and the timer for operating the fan 230 is energized. After a time obtained by the timer has elapsed, from the commencement of the operation of the fan 230, the routine goes to step 408 and the fan timer is stopped, and further the operation of the fan 230 is stopped.

The time interval $\Delta t$ measured by the interval timer at step 402, i.e., the time interval for measuring the container surface wall temperature difference $T_1'-T_1$ at step 405 was 1 hour, and the threshold value a for the drop of the wall temperature $(T_1'-T_1)$ during the time interval of 1 hour, $\Delta t$ was 10° C. Furthermore, the threshold value $\Delta T_a$ of the inside container temperature $T_2$ to the container wall temperature $T_1$ was 1° C. Finally, the fan operating time set by the fan timer at step 407 was about 12 minutes.

The setting of a time of 12 minutes for operating the fan 230 at step 407 in FIG. 16 was determined by the following test shown in FIG. 17. The data in FIG. 17 shows a relationship between the time lapsed after the operation of the fan 230 is commenced and relative humidity inside the container. A line Q is obtained when the operating time of the fan 230 is 2.5 minutes, and a line R is obtained when the operation time of the fan 230 is 5 minutes. In both cases, the control condition is such that the operation of the fan 230 is commenced when the container surface wall temperature $T_1$ is lower than the inside container temperature $T_2$, by a value larger than 1.5° C. (yes result at step 406 in FIG. 16). Furthermore, the interval at which the fan (step 402 in FIG. 16) is operated is 60 minutes. It will be seen from FIG. 17 that, in the time of 2.5 minutes (line Q), it is difficult to bring the relative humidity lower than a humidity target value.

FIG. 8(c) and 8(d) show a result of a simulation of the temperature of the wall of the container, in view of the results of the test shown in FIG. 17. FIG. 8(c) shows a change in the humidity at the wall surface, and FIG. 8(d) shows an accumulated dew condensation time, which is a total time wherein the dew condensation condition is obtained $((T_1'-T_1)/\Delta t \geq a, T_2-T_1 \geq \Delta T_a)$. A solid line Q and a dotted line U are curves obtained when the fan was operated for a time of 2.5 minutes. Contrary to this, solid lines S and V are curves obtained when the fan was operated for a time of 12 minutes, in accordance with the preferred embodiment of the present invention. When the time for which the fan 230 is operated is to short, it is impossible to lower the relative humidity of the air inside the container to below the target value, and dew condensation may be generated when there is a rapid reduction of the temperature at areas as shown by T in FIG. 8(c). As clear from the above, the operation of the fan 230 for a sufficient time according to the embodiment of the present invention prevents dew condensation in the container.

Noted, according to this embodiment of the present invention, an alkali based battery is used, and the amount of air flow induced by the fan 230 is 1.0 m³ per minute.

FIG. 8(a) shows a very severe situation from the view point of the occurrence of dew condensation, where a rapid drop in the wall surface temperature C occurs every day in the evening, and the wall surface temperature C becomes lower than the temperature inside the container B throughout the night. Even if this situation prevails continuously, it is possible according to the present invention to obtain a stable use of the batteries for about 15 days before they are exhausted. Note, this period for which it is possible to use the batteries without changing same is longer than the period (days) usually required for transporting a container from the start of the Journey to the end. Further, considering that a container is not always subjected to a severe condition such as shown in FIG. 8(a) during transportation, a replacement of the batteries is not usually required throughout the transportation period. Instead of using dry batteries, rechargeable batteries or storage batteries can be used.

In the above embodiment, the threshold value $\Delta Ta$ of the temperature difference between the temperature inside the container $T_2$ and the temperature at the inner wall surface of the container $T_1$ is 1° C. The threshold value was determined from the result of the test shown in FIG. 18. Namely, FIG. 18 shows the relationships between a lapse of time and the relative humidity. A solid line U is a result obtained when the threshold value $\Delta Ta$ of the temperature difference is 1° C., and a dotted line V is a result obtained when the threshold value $\Delta Ta$ of the temperature difference is 1.5° C. As will be easily understood from FIG. 18, the threshold value $\Delta Ta$ of the temperature difference of 1.5° C. may make the relative humidity higher than the target value (92%). Therefore, the threshold value $\Delta Ta$ of 1.0° C. is selected to obtain the target relative humidity (92%). Note, the result of the test in FIG. 8 was obtained when the operating time of the fan 230 by the fan operating timer at step 407 in FIG. 16 was 5 minutes, and the interval of the adjacent operations of the fan 230 by the interval timer at step 402 was 60 minutes.

Although the above description is directed to a preferred embodiment, many modification and changes of the present invention can be made. FIG. 19 shows an another embodiment of the intake unit 210. In this embodiment the intake opening 200 has a circular shape. As in the first embodiment in FIG. 12, a baffle plate 214 is provided for preventing an entry of rainwater inside the container. The baffle plate 214 directs the rainwater from the outside of the container downward to the drain pipe 216 opening outside of the container 100. Note, the unit 210 in FIG. 19 has an outside diameter of about 15 centimeters.

FIG. 20 shows a modification of the exhaust unit 220. In this case, in place of the cover 223 in FIG. 13, a louver door type damper 240 is arranged outside of the fan motor 230. The damper 240 is connected to a damper motor 241 via a coupling 240-1, so that the damper 240 can be moved between an open position where an air flow passing through the damper 240 is allowed and a closed position where an air flow passing the damper 240 is prohibited, to prevent the entry of rainwater from outside of the container 100. As will be understood from the test shown in FIG. 15, in this construction, it is possible that an operation of the fan 230 is influenced by the reverse flow from the outside of the container to the inside of the container, by which the ventilation operation is substantially lost. Therefore, it is preferable to arrange a cover outside the damper 240.

FIG. 21 show an example of an arrangement of the exhaust unit 220 in the wall of the container 100. As in a usual construction, the outer wall of the container 100 is formed as a corrugated shape having alternate recesses and projections extending vertically. As shown in FIG. 21, the shape of the unit 220 is complimentary to the shape of the recess of the wall, and a flange portion 222 is connected to the wall. As a result of this construction, the unit 220 is neatly connected to the outer wall of the container but is prevented from being prominently projected therefrom, and thus is less likely to be damaged by accidental contact.

FIG. 22 shows a flowchart illustrating another pattern for operating the control unit 235. In the embodiment shown in FIG. 16, only a single threshold value $\Delta Ta$ is used for a determination of the drop of the inner wall temperature of the container, for obtaining an operation of the fan 230 for a fixed period. In this modification shown in FIG. 22, the time for which the fan 230 is operated is varied in accordance with the values of the rate of the drop of the inner wall temperature $T_1$ of the container 100. Steps 400 to 404 are the same as in FIG. 16. At step 420 it is determined if the difference of the temperature $T_2$ inside the container 100 with respect to the temperature $T_1$ at the inner surface of the wall of the container is larger than a predetermined value $\Delta Ta$. The routine below step 421 is cancelled, to make the fan 230 off when the difference of the temperature $T_2$ inside the container 100 with respect to the temperature $T_1$ at the inner surface of the wall of the container is not larger than a predetermined value $\Delta Ta$. When a yes determination is obtained at the step 420 the routine goes to step 421 and it is determined if the rate of drop of the temperature $(T_1' - T_1)/\Delta T$ is larger than 4° C. When it is determined that the rate of drop of the temperature $(T_1' - T_1)/\Delta T$ is larger than 4° C. at step 421, the routine goes to step 424, and the fan 230 is operated for a period of 10 minutes. When it is determined that the rate of drop of the wall temperature $(T_1' - T_1)/\Delta T$ is not larger than 4° C. at step 421-1, the routine goes to step 421-1 and it is determined if the rate of drop of the wall temperature $(T_1' - T_1)/\Delta T$ is larger than 1° C. If the result is yes, the routine goes to step 423 and the fan 230 is operated for 5 minutes. When it is determined if that the rate of drop of the wall temperature $(T_1' - T_1)/\Delta T$ is not larger than 1° C., the routine below step 423 is by-passed, and the operation of the fan 230 is cancelled. This operation of the embodiment in FIG. 22 allows the time for operating the fan 230 to be changed in accordance with the degree of change in the wall temperature $T_1$ during a predetermined period at, so that an optimum ventilation can be obtained.

To control the ventilated amount of the air, instead of controlling the time for operating the fan 230, the amount of air generated by the fan 230 can be changed between steps 421, 422 and 423.

In the previously explained embodiments, it is assumed that the wall of the container is made of a steel material not having any heat insulating ability. According to the test by the inventors, however, it is found that, in a container without any heat insulating ability, it is not ineffective to lower the temperature difference between the inside and outside of the container even if air is introduced by the ventilation device, and thus dew condensation is not effectively prevented. According to the result of the analysis by the inventor, a radiation cooling at the wall of the container causes the atmospheric temperature to be higher than the wall temperature inside the container when no heat insulation means is provided for. Namely, the container with no heat insulating ability may cause the temperature inside the container to rapidly drop due to the radiation cooling, and thus the container wall temperature frequently may be lower than the temperature of the atmospheric air. In such a situation, the introduction of the outside air, even if intensive, cannot prevent dew condensation.

As easily understood, under such a situation it is important to reduce the radiation cooling. In an embodiment shown in FIG. 23, to reduce the influence of radiation cooling, a coating 131 made of a heat insulating material is placed on the inner top wall 130 of the container 100. The heat insulating material coating 131 is composed of a polyurethane foam and is applied on the inner top wall 131 of the container.

In an embodiment shown in FIG. 24, the heat insulating material coating 131 can be placed on an outer surface of the top wall 130 of the container. As a known technique, the outer wall of the container has a corrugated shape, and therefore, the coating 131 of the insulating material can have a profile complimentary to that of the wall. In this case, the thickness of the coating 131 can be changed in accordance with the corrugated cross-sectional shape of the outer wall of the container, i.e., to between 15 millimeters to 40 millimeters, whereby an outer flat surface of the coating 130 can be obtained. Where the head insulating material coating is formed on the outer surface of the wall of the container, a water proof paint can be advantageously applied to the upper surface of the heat insulating material coating 131, to obtain a water proof construction. FIG. 25 shows a schematic view wherein the heat insulating material 131 is arranged on the top wall of the container 100. FIG. 26 shows the relationships between a time at night and values of the temperature. A curve P shows an atmospheric temperature, a curve O shows a temperature at the inner surface of the top wall of the container when the heat insulating layer 131 is placed at the top wall of the container, and a curve R shows a temperature at the inner surface of the top wall of the container without such a top heat insulating layer 131. As will be easily seen from FIG. 26, when the container 100 does not have a top heat insulating layer 131, the temperature at the inner surface of the ceiling wall, R can drop much quicker than the atmospheric temperature P, resulting in dew condensation. Contrary to this, when the heat insulating layer 131 is provided at the outer surface of the top wall of the container, according to the present invention, such a quick drop in the temperature at the inner top wall of the container is prevented, and this effectively prevents dew condensation. As a result, it was affirmed that the provision of the heat insulating layer at the top wall of the container is very advantageous for the ventilation apparatus according to the present invention.

FIG. 27 shows a modification wherein, in addition to the heat insulating layer 131 on the outer top wall of the container, layers 131 of the heat insulating material are placed on side walls 132 of the container 100.

It should be appreciated that, to control the operation of the ventilation apparatus, in addition to the temperature from the temperature sensors 236 and 237 as shown in FIGS. 14, a signal from a humidity sensor can be employed. Namely, in the previous embodiments, the fan 230 of the ventilation device is operated when it is determined that the dew condensation is likely to be generated, judged by a rapid change in the temperature, but the rapid change in the temperature does not always generate dew condensation under particular conditions, for example, when the absolute humidity is low due to a dryness of the atmospheric air. On the other hand, as the fan 230 is battery-driven, unnecessary ventilation operations must be prevented to thus prolong the life of the batteries. Therefore, in another embodiment of the present invention, in addition to a temperature sensor(s), a humidity sensor is provided for stopping the operation of the ventilation fan 230 when it is determined that the humidity inside the container 100 detected by the humidity sensor is lower than a predetermined value, such as 90%.

FIG. 28 is a flow chart illustrating how this embodiment operates; steps 401 to 406 are the same as the respective steps in FIG. 16. When it is determined that the dew condensation is likely to be generated, from the value of the rate of the drop $(T_1'-T_1)/\Delta t$ larger than the predetermined value a (yes result at step 405), or the wall surface temperature difference $T_2-T_1$ is larger than the predetermined value $\Delta T_a$ (yes result at step 406), the routine goes to step 440 and the value $\theta 1$ detected by the humidity sensor is measured, and to step 441 where it is determined if the detected value $\theta 1$ of the humidity sensor is larger than a predetermined value $\theta_0$. When it is determined that the detected humidity $\theta 1$ is larger than a predetermined value $\theta_0$, the routine goes to steps 407 and 408 for operating the ventilation fan 230 for a period determined by the fan timer at step 407. When it is determined that the detected humidity $\theta 1$ is smaller than a predetermined value $\theta_0$, it is considered that there is no possibility of dew condensation. In this case, the routine below step 407 for operating the fan 230 is by-passed, and thus an unnecessary ventilation operation by the fan 230 is prohibited.

Preferably, the humidity sensor is located in the container as far as possible from the inner wall thereof, since it is intended for detecting the humidity inside the container, but it is not practical for the humidity sensor to be separated from the unit 220. Therefore, in another embodiment, the humidity sensor can be mounted to the case 232 of the unit 220, similar to the temperature sensors 236 and 237.

In the above embodiment, the threshold value $\theta_0$ of the humidity is 90%, while considering that the humidity sensor may have an error of $\pm 10\%$. Namely, when the humidity sensor has a high degree of precision, the fan 230 need not be operated when the humidity does not reach a value close to 100%. For example, the ventilation fan 230 could be stopped when the detected humidity is lower than 99%. Usually, however, the humidity sensor has an error of $\pm 10\%$, due to the limitation of the location when it is mounted, and therefore, the threshold value of the humidity of 90% was selected.

In the above embodiment, the humidity sensor is provided but is merely used to supplement the ventilation control by the temperature sensor. As described above, the humidity sensor has an error, and thus a threshold humidity value of 90 percent is used at step 441 in FIG. 28 for determining if the fan is to be operated or not. If humidity sensor is used only for controlling the fan 230, it is necessarily operated for a relatively long period, and thus the batteries are soon exhausted. This is the reason why the temperature sensors are mainly used for a basic determination of whether the fan 230 should be operated (steps 405 and 406 in FIG. 28), and the signal from the humidity sensor is supplementarily used for determining if the fan 230 should be operated or not (step 441). This solution allows the dew condensation to be precisely predicted while prolonging the service life of the batteries.

While the present invention is described with reference to attached drawings, many modifications and changes can be made by those skilled in this art, without departing from the scope and spirit of the present invention.

We claim:

1. A container for goods comprising:
   a container body having a generally rectangular parallelepiped shape with outer walls defining a space therein for storing goods;
   said outer walls also defining an intake opening for an introduction of atmospheric air into the space of the container and an exhaust opening for a removal of the air from the space of the container to the atmosphere;
   the intake and the outlet openings being provided at different locations inside the container;
   a fan for generating a forced flow of the air from the intake opening to the exhaust opening via the space of the container;
   a sensor for detecting a temperature inside the container and issuing electric signals indicating the detected temperature;
   determining means for determining if a change in the detected temperature over a unit of a time is larger than a predetermined value, and;
   control means for operating the fan when the determining means determines a condition of the detected temperature over a unit of a time being larger than a predetermined value.

2. A container according to claim 1, wherein one of the inlet opening and the outlet opening is located at a top of one of the walls of the container defining an entrance for the goods, and the other of said openings is located at the top of the wall of the container opposite said one wall.

3. A container according to claim 1, wherein said sensor detects a temperature at the wall inside the container.

4. A container according to claim 1, further comprising another sensor for detecting a temperature at a different location in the container, and means for determining if a difference in the temperatures at the two locations is larger than a predetermined value, said control means operating the fan when said determination is positive.

5. A container according to claim 1, wherein said fan is arranged adjacent to the exhaust opening.

6. A container according to claim 5, further comprising a cover arranged adjacent to the fan for preventing a reverse flow of the air from the atmosphere into the container via the exhaust opening.

7. A container according to claim 1, wherein said fan is operated by dry batteries or storage batteries.

8. A container according to claim 1, further comprising a timer means for limiting the operation of the fan to a predetermined period after it is determined that a calculated change is larger than a predetermined value.

9. A container according to claim 1, further comprising a layer of heat insulating material provided at least on the top wall of the container.

10. A container according to claim 9, wherein the layer of heat insulating material is arranged on the inner top wall of the Container.

11. A container according to claim 10, further comprising an additional layer made of foamed plastic resin material applied on the of heat insulating material layer.

12. A container according to claim 1, further comprising a humidity sensor for detecting a humidity in the container, and humidity determining means for determining if the detected humidity is lower than a predetermined value, said control means de-energizing the fan when the humidity determining means determines that the humidity is lower than a predetermined value, regardless of any change in the temperature.

13. A container according, to claim 12, further comprising means for determining if the detected humidity is larger than a predetermined value, and means for allowing the operation when the result of the determination is positive.

14. A container for goods comprising:
    a container body having a generally rectangular parallelepiped shape with outer walls defining a space therein for storing goods;
    said outer walls also defining an intake opening for an introduction of atmospheric air into the space inside the container, and an exhaust opening for a removal of the air from the inside space of the container to the atmosphere;
    the intake and the outlet openings being provided at different locations on the walls;
    a fan for generating a forced flow of an air from the intake opening to the exhaust opening via said inside space of the container;
    a first temperature sensor for detecting a temperature at the walls of the container;
    a second temperature sensor for detecting a temperature of the air inside the container;
    first determining means for determining a condition if the wall temperature detected by the first sensor is lower than a predetermined value with respect to the air temperature detected by the second sensor;
    second determining means for determining a condition if a change in the wall temperature detected by the first sensor means for a unit of a time is larger than a predetermined value, and;
    control means for operating the fan when one of the first determining means and the second determining means determines the condition.

* * * * *